(12) United States Patent
Kim

(10) Patent No.: US 12,335,639 B2
(45) Date of Patent: Jun. 17, 2025

(54) IMAGE SENSOR AND IMAGE PROCESSING DEVICE COMPRISING IMAGE SENSOR WITH REFERENCE RAMP SIGNAL

(71) Applicant: Samsung Electronics Co., Ltd., Suwon-si (KR)

(72) Inventor: Hyunjong Kim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 104 days.

(21) Appl. No.: 18/463,919

(22) Filed: Sep. 8, 2023

(65) Prior Publication Data
US 2024/0244343 A1 Jul. 18, 2024

(30) Foreign Application Priority Data

Jan. 17, 2023 (KR) .......................... 10-2023-0006986

(51) Int. Cl.
*H04N 25/51* (2023.01)
*H04N 23/71* (2023.01)
*H04N 25/57* (2023.01)
*H04N 25/772* (2023.01)

(52) U.S. Cl.
CPC ............. *H04N 25/51* (2023.01); *H04N 23/71* (2023.01); *H04N 25/57* (2023.01); *H04N 25/772* (2023.01)

(58) Field of Classification Search
CPC ........ H04N 25/51; H04N 23/71; H04N 25/57; H04N 25/772; H04N 25/59
See application file for complete search history.

(56) References Cited

U.S. PATENT DOCUMENTS

| 7,019,720 | B2 | 3/2006 | LeChevalier | |
|---|---|---|---|---|
| 7,660,408 | B1 | 2/2010 | Poulis et al. | |
| 8,866,494 | B2 | 10/2014 | Ryshtun et al. | |
| 9,723,238 | B2 | 8/2017 | Lee et al. | |
| 11,343,449 | B2 * | 5/2022 | Paik | H04N 25/772 |
| 11,924,571 | B2 * | 3/2024 | Matsuura | H04N 25/778 |
| 2011/0163901 | A1 | 7/2011 | Quiquempoix et al. | |
| 2011/0267214 | A1 | 11/2011 | Roach | |
| 2021/0250530 | A1 * | 8/2021 | Paik | H04N 25/78 |
| 2022/0321825 | A1 * | 10/2022 | Matsuura | H04N 25/772 |

* cited by examiner

*Primary Examiner* — Nicholas G Giles
(74) *Attorney, Agent, or Firm* — Harness, Dickey & Pierce, P.L.C.

(57) ABSTRACT

An image sensor includes a pixel configured to output a pixel signal through a column line, a ramp signal generator configured to generate a reference ramp signal having a level which decreases based on a desired slope, a first gain circuit configured to receive the reference ramp signal, and generate a first ramp signal based on the reference ramp signal, the first ramp signal having a different slope than the reference ramp signal, a second gain circuit configured to receive the reference ramp signal, and generate a second ramp signal based on the reference ramp signal, the second ramp signal having a different slope than the first ramp signal, a first comparator configured to generate a first comparison signal based on the first ramp signal and the pixel signal, and a second comparator configured to generate a second comparison signal based on the second ramp signal and the pixel signal.

20 Claims, 12 Drawing Sheets

IMAGE SENSOR AND IMAGE PROCESSING DEVICE COMPRISING IMAGE SENSOR WITH REFERENCE RAMP SIGNAL

CROSS-REFERENCE TO RELATED APPLICATION

This U.S. non-provisional application claims the benefit of priority under 35 U.S.C. § 119 to Korean Patent Application No. 10-2023-0006986, filed on Jan. 17, 2023, in the Korean Intellectual Property Office, the disclosure of which is incorporated by reference herein in its entirety.

BACKGROUND

Various example embodiments of the inventive concepts relate to an image sensor, and more particularly, to an image sensor including a first comparator and a second comparator, an image processing device including the same, and/or a method of operating the image sensor, etc.

An image sensor is a device which captures a two-dimensional or three-dimensional image of an object. The image sensor generates an image of an object using at least one photoelectric conversion element which reacts according to and/or based on the intensity of light reflected from the object. With the development of Complementary Metal-Oxide Semiconductor (CMOS) technology, CMOS image sensors using CMOS are widely used. Recently, a technique of comparing one pixel signal with ramp signals having different slopes has been developed to increase the dynamic range of an image sensor.

SUMMARY

Various example embodiments of the inventive concepts provide an image sensor including an analog-to-digital conversion circuit for processing a pixel signal of a pixel through a dual slope gain within one frame, an image processing device including the same, and/or a method of operating the image sensor, etc.

According to at least one example embodiment of the inventive concepts, there is provided an image sensor including a pixel configured to output a pixel signal through a column line, a ramp signal generator configured to generate a reference ramp signal having a level that decreases based on a desired slope, a first gain circuit configured to receive the reference ramp signal, and generate a first ramp signal based on the reference ramp signal, the first ramp signal having a different slope than the reference ramp signal, a second gain circuit configured to receive the reference ramp signal, and generate a second ramp signal based on the reference ramp signal, the second ramp signal having a different slope than the first ramp signal, a first comparator configured to generate a first comparison signal based on the first ramp signal and the pixel signal, and a second comparator configured to generate a second comparison signal based on the second ramp signal and the pixel signal.

According to at least one example embodiment of the inventive concepts, there is provided an image sensor including a pixel configured to output a pixel signal through a column line, a ramp signal generator configured to generate a reference ramp signal having a level that decreases based on a desired slope, a first comparison circuit configured to generate a first ramp signal having a first slope, and generate a first comparison signal based on the first ramp signal and the pixel signal, and a second comparison circuit configured to generate a second ramp signal having a second slope based on the reference ramp signal, the second slope being different from the first slope, and the second comparison circuit is further configured to generate a second comparison signal based on the second ramp signal and the pixel signal.

According to at least one example embodiment of the inventive concepts, there is provided an image processing device including a pixel configured to output a pixel signal through a column line, a ramp signal generator configured to generate a reference ramp signal having a level that decreases with a desired slope, an analog-to-digital conversion circuit configured to generate a first comparison signal and a second comparison signal based on the pixel signal and the reference ramp signal, a signal processor configured to generate high dynamic range (HDR) image data by merging first image data and second image data, the first image data generated based on the first comparison signal, and the second image data generated based on the second comparison signal, and the analog-to-digital conversion circuit comprises, a first comparator configured to receive the pixel signal and a first ramp signal through a first set of voltage input capacitors connected to a first input node and a second input node, respectively, and the first comparator is further configured to generate the first comparison signal based on the pixel signal and the first ramp signal, a second comparator configured to receive the pixel signal and a second ramp signal through a second set of voltage input capacitors, and the second comparator is further configured to generate the second comparison signal based on the pixel signal and the second ramp signal, and a voltage dividing capacitor connected to the first input node and ground, wherein a slope of the first ramp signal is different from a slope of the second ramp signal, and a difference between the slope of the first ramp signal and the slope of the second ramp signal is based on a capacitance of the voltage dividing capacitor.

BRIEF DESCRIPTION OF THE DRAWINGS

Various example embodiments will be more clearly understood from the following detailed description taken in conjunction with the accompanying drawings in which.

DETAILED DESCRIPTION

Figure 1:
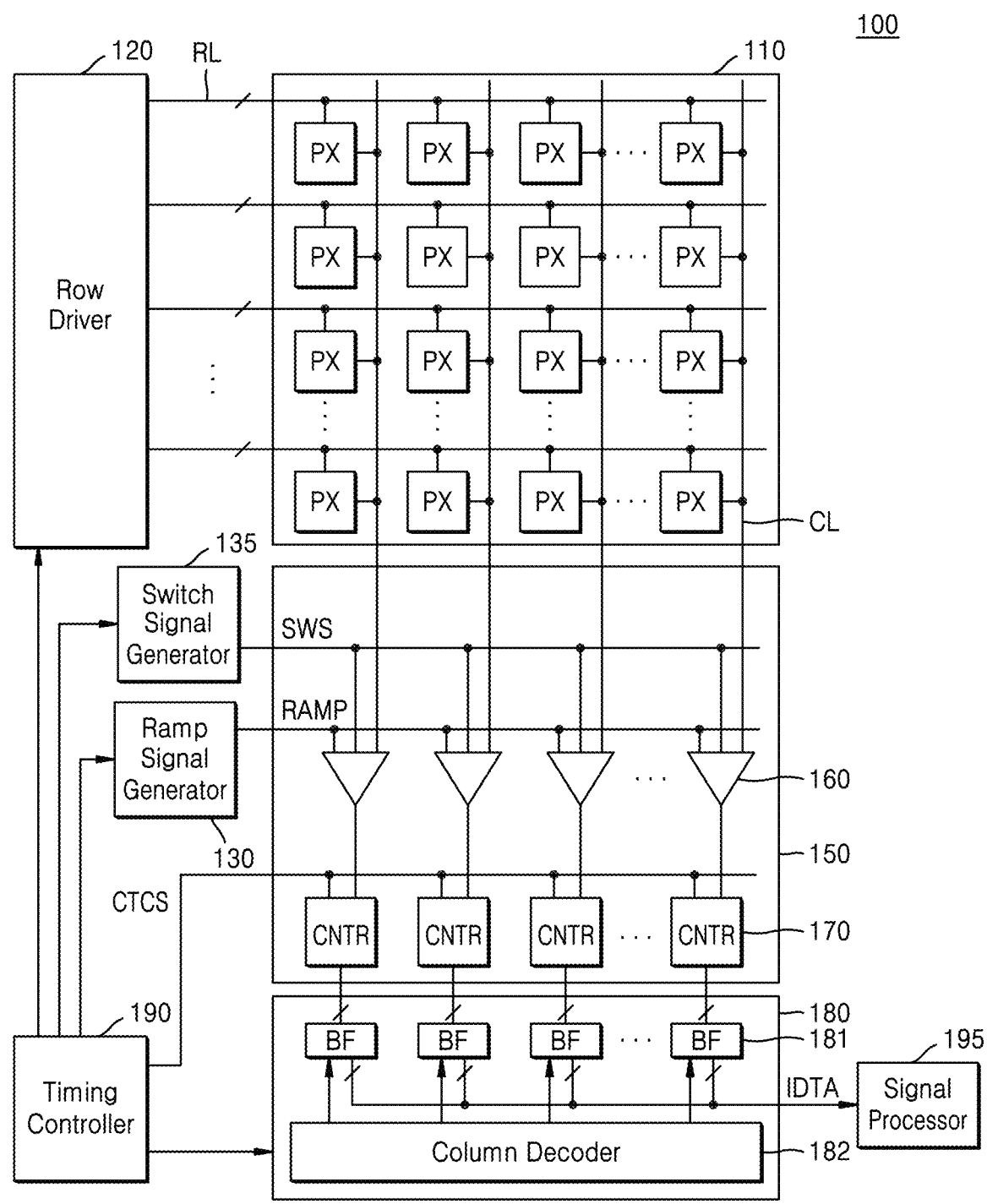
FIG. 1 is a block diagram illustrating an image sensor according to at least one example embodiment.

FIG. 1 is a block diagram illustrating an image sensor according to at least one example embodiment.

An image sensor 100 may be mounted on an electronic device having an image and/or light sensing function, but is not limited thereto. For example, the image sensor 100 may be mounted on electronic devices, such as cameras, smartphones, wearable devices, Internet of Things (IoT) devices, tablets, Personal Computers (PCs), Personal Digital Assistants (PDAs), Portable Multimedia Players (PMPs), Global Positioning System (GPS), gaming systems, and the like. In addition, the image sensor 100 may be mounted on an electronic device provided as a component for vehicles, furniture, manufacturing facilities, doors, various measuring devices, and the like.

Referring to FIG. 1, the image sensor 100 may include a pixel array 110, a row driver 120, a ramp signal generator 130, an analog-to-digital converter circuit 150 (ADC circuit), a data output circuit 180, and/or a timing controller 190, etc., but is not limited thereto. The image sensor 100 according to one or more of the example embodiments of the inventive concepts may further include a switch signal generator 135 and/or a signal processor 195, etc. According to some example embodiments, the ramp signal generator 130, the ADC circuit 150, the data output circuit 180, and/or the timing controller 190 may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The pixel array 110 includes a plurality of row lines RL, a plurality of column lines CL, and/or a plurality of pixels PX, etc., connected to the plurality of row lines RL and the plurality of column lines CL, and the pixel array 110 may be arranged in a matrix alignment.

Each of the plurality of pixels PX may include at least one photoelectric conversion element, and the pixels PX may sense light using a photoelectric conversion element and may output a pixel signal that is an electrical signal according to and/or based on the sensed light. For example, the photoelectric conversion element may include a photodiode, a phototransistor, a photogate, and/or a pinned photodiode, etc. Hereinafter, for the convenience of explanation and brevity, the photoelectric conversion element may be referred to as a photodiode, but the example embodiments are not limited thereto.

Each of the plurality of pixels PX may detect light in a certain spectral region. For example, the plurality of pixels PX may include a red pixel for converting light in the red spectral region into electrical signals corresponding to a red color, a green pixel for converting light in the green spectral region into an electrical signal corresponding to a green color, and/or a blue pixel for converting light in the blue spectrum region into an electrical signal corresponding to a blue color, etc. However, the example embodiments of the inventive concepts are not limited thereto, and the plurality of pixels may further other colored pixels, including white pixels, etc. As another example, the plurality of pixels may include pixels combined in different color configurations, for example, a yellow pixel, a cyan pixel, and/or a green pixel, etc.

A color filter array for transmitting light in a certain spectral region may be disposed on the plurality of pixels PX, and a color detectable by a corresponding pixel may be determined according to and/or based on a color filter disposed on each of the plurality of pixels PX. However, the example embodiments of the inventive concepts are not limited thereto, and in at least one example embodiment, in the case of a certain photodiode, light of a certain wavelength band may be converted into an electrical signal according to and/or based on the level of the electrical signal applied to the photodiode, etc.

In the pixel array 110 according to at least one example embodiment, one or more of the pixels PX may have a dual conversion gain, but is not limited thereto. A pixel PX having a dual conversion gain is described below with reference to FIG. 5.

The row driver 120 drives the pixel array 110 in units of rows. The row driver 120 may decode at least one row control signal (e.g., an address signal) received from the timing controller 190 and may select at least one row line from among a plurality of row lines constituting the pixel array 110 in response to the decoded row control signal. For example, the row driver 120 may generate at least one selection signal for selecting one of a plurality of rows. Also, the pixel array 110 may output at least one pixel signal, for example, a pixel voltage, from a row selected based on a selection signal provided from the row driver 120. The pixel signal may include a reset signal and/or an image signal, etc.

The row driver 120 may transmit control signals for outputting at least one pixel signal to the pixel array 110, and the pixel PX may output at least one pixel signal by operating in response to and/or based on the control signals.

The ramp signal generator 130 may generate at least one reference ramp signal (e.g., a ramp voltage) of which the level rises and/or falls with a desired and/or preset slope under the control of the timing controller 190.

The ADC circuit 150 may convert at least one pixel signal, that is an analog signal input from the pixel array 110, into at least one digital signal. The ADC circuit 150 may include a plurality of comparators 160 and/or a plurality of counters 170, but is not limited thereto.

The comparator 160 may be connected to at least one corresponding column line among the plurality of column lines CL. In at least one example embodiment, at least two comparators 160 may be connected to one column line CL, but the example embodiments are not limited thereto. Each of the plurality of comparators 160 may receive at least one reference ramp signal RAMP from the ramp signal generator 130 and may compare the reference ramp signal RAMP with the pixel signal output from the pixel PX connected to the column line CL.

The comparator 160 may receive at least one pixel signal from at least one corresponding column line CL among a plurality of column lines CL, receive the at least one reference ramp signal RAMP from the ramp signal generator 130, compare the at least one pixel signal to the at least one reference ramp signal RAMP, and output at least one comparison signal (referred to as a comparison result signal), etc. The comparator 160 outputs a comparison signal that transitions from a first level (e.g., a logic high) to a second level (e.g., a logic low) when the level of the reference ramp signal RAMP is equal to the level of the pixel signal, but the example embodiments are not limited thereto. A time point at which the level of the comparison signal transitions may be determined according to and/or based on the level of the pixel signal and the offset and/or slope of the ramp signal, but is not limited thereto.

The comparator 160 may be referred to as a Correlated Double Sampling (CDS) circuit that performs a CDS technique, but the example embodiments are not limited thereto. The pixel signals output from the plurality of pixels PXs may have deviations due to, for example, inherent characteristics of each pixel PX and/or deviations due to differences in logic characteristics for outputting pixel signals from the pixels 111, etc. To compensate for the deviation between these pixel signals, calculating a reset component (and/or reset signal) and/or an image component (and/or image signal) for each of the pixel signals and extracting the difference as an effective signal component is referred to as the CDS technique and/or method.

The comparator 160 may sample at least one pixel signal provided from the pixel PX according to a desired CDS method. The comparator 160 may sample a reset signal received as a pixel signal and compare the reset signal with a reference ramp signal RAMP to generate a comparison signal according to and/or based on the reset signal, but is not limited thereto. A comparison signal according to and/or based on the reset signal may be referred to, for example, as a reset comparison signal, etc. Then, the comparator 160 may sample an image signal correlated with the reset signal and may compare the image signal with the reference ramp signal RAMP to generate a comparison signal according to and/or based on the image signal, etc. A comparison signal according to the image signal may be referred to as an image comparison signal.

Each of the plurality of counters 170 is connected to an output terminal of each of the plurality of comparators 160 to count based on an output signal (e.g., the comparison signal, etc.) of each comparator 160. The counter control signal CTCS may include a counter clock signal CLK (see FIG. 3), a counter reset signal for controlling reset operations of the plurality of counters 170, and/or an inversion signal for inverting internal bits of each of the plurality of counters 170, etc., but is not limited thereto. The counter 170 counts the comparison signal according to and/or based on the counter clock signal CLK (see FIG. 3) and outputs a counted value as a digital signal (e.g., a pixel value), etc.

The counter 170 may include an up/down counter and/or a bit-wise counter, but is not limited thereto. According to at least one example embodiment, the bit-wise counter may perform an operation similar to that of the up/down counter. For example, a bit-wise counter may perform a function of performing only an up count and a function of inverting all bits inside the counter to make the value of the bits 1's complement when a desired and/or certain signal is input. After performing a reset count, the bit-wise counter may convert a result of the reset count into a 1's complement, that is, a negative value, by inverting the result of the reset count, etc.

However, the image sensor 100 according to one or more of the example embodiments of the inventive concepts are not limited thereto. In at least one example embodiment, the image sensor 100 may further include a counting code generator which performs counting codes under the control of the timing controller 190, etc. The counting code generator may be implemented as, for example, a gray code generator and may generate a plurality of code values having a resolution according to and/or based on a set number of bits as counting codes, but is not limited thereto. For example, the plurality of counters 170 may include a latch circuit and/or an arithmetic circuit, etc., and the latch circuit may receive a counting code from the counting code generator and an output signal from each of the plurality of comparators 160 and latch the code value of the counting code at the time point at which the level of the comparison signal transitions, etc. The arithmetic circuit may generate an image signal value from which the reset level of the pixel PX is removed by calculating the reset value and the image signal value, etc. Each of the plurality of counters 170 may output an image signal value from which the reset level is removed as a pixel value.

The reference ramp signal RAMP generated by the ramp signal generator 130 may be provided to each of the plurality of comparators 160 provided in the ADC circuit 150. In at least one example embodiment, as shown in FIG. 2, two comparators, for example, a first comparator 161 (see FIG. 2) and a second comparator 162 (see FIG. 2), may be connected to one column line CL, but the example embodiments are not limited thereto.

Figure 2:
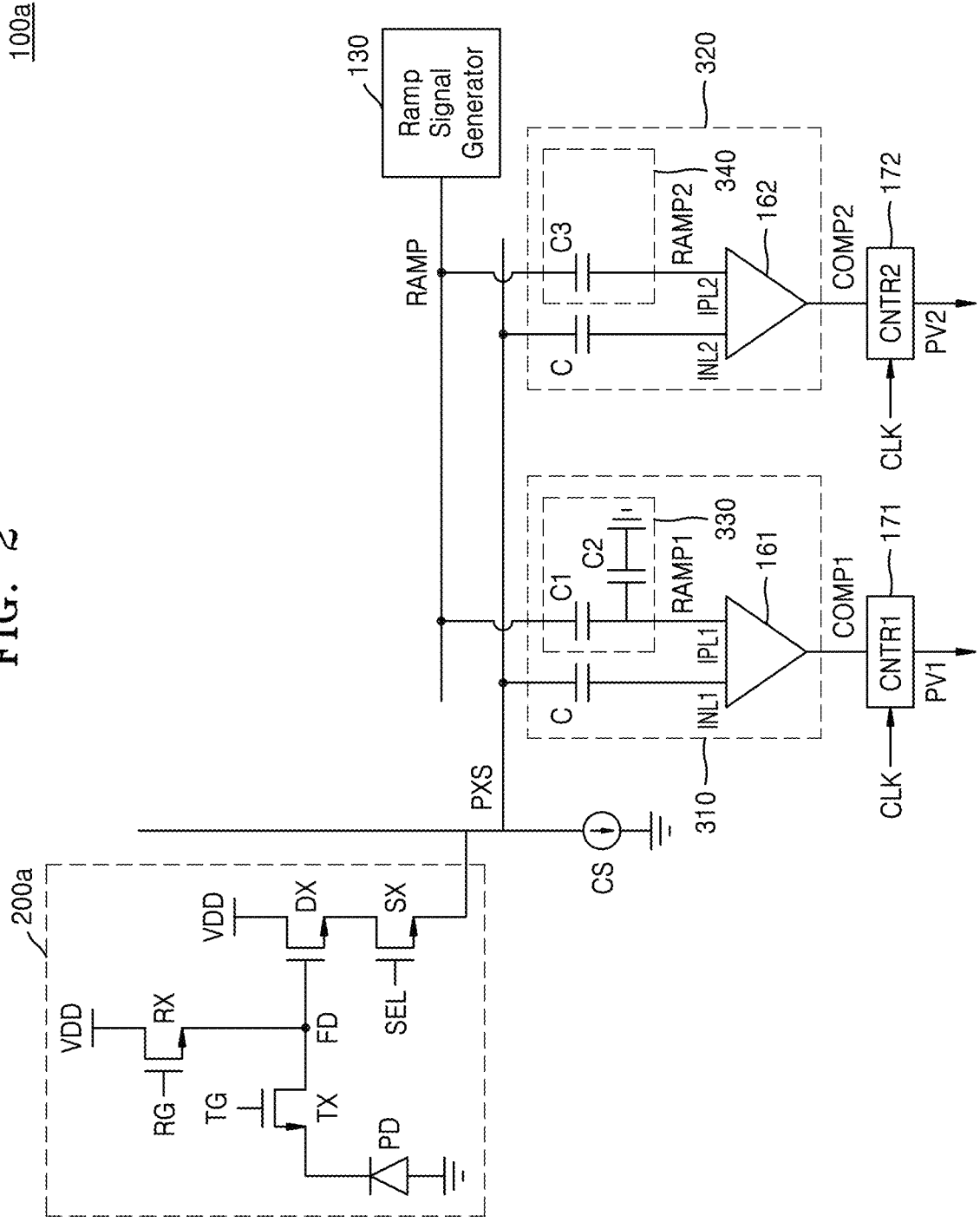
FIG. 2 is a circuit diagram illustrating an image sensor according to at least one example embodiment.

Referring to FIG. 2, in at least one example embodiment, a plurality of comparators, e.g., two comparators, such as the first comparator 161 and the second comparator 162, may be used simultaneously, but are not limited thereto. On the other hand, referring to FIGS. 5 and 6, the plurality of comparators, e.g., the first comparator 161 and the second comparator 162 for a pixel signal PXS (see FIG. 6) output from one pixel 200b (see FIG. 5), may be used at different timings (e.g., serially, asynchronously, etc.). Detailed description is given with reference to FIGS. 2, 5, and 6.

In at least one example embodiment, the same reference ramp signal RAMP may be provided to the first comparator 161 and the second comparator 162 connected to the same column line CL. At this time, capacitors may be connected to the input nodes of the first comparator 161 and the second comparator 162, and signals RAMP1 and RAMP2 (see FIG. 2) having offsets and slopes different from those of the reference ramp signal RAMP according to and/or based on the connection state of the capacitor may be input as ramp signals to input nodes of the first comparator 161 and the second comparator 162, etc. Therefore, as two ramp signals having different slopes based on one reference ramp signal are input to the first comparator 161 and the second comparator 162, respectively, and as one pixel signal is compared by the first comparator 161 and the second comparator 162 with two ramp signals with different offsets and slopes, respectively, different comparison results may be obtained for the one pixel signal. That is, a dual slope gain may be obtained. Here, the dual slope gain refers to generating different comparison signals based on one pixel signal by comparing one pixel signal with at least two ramp signals having different slopes, but the example embodiments are not limited thereto. An image having a high dynamic range may be obtained based on at least two comparison signals by the dual slope gain.

In at least one example embodiment, the image sensor 100 may further include at least two capacitors connected to an input node of the comparator 160 and a switch capable of changing a connection relationship between the input nodes of the comparator 160, and the switch signal generator 135 may provide, to the switch, a switch control signal SWS for controlling the operation of the switch. According to and/or based on the switch operation, at least two capacitors may be connected in parallel between the ramp signal generator 130 and the input node of the comparator 160 or in series between the ramp signal generator 130 and the ground, and an offset and/or a slope of a ramp signal may change according to and/or based on the connection relationship. This is described below with reference to FIG. 9.

The data output circuit 180 may temporarily store the pixel values output from the ADC circuit 150 and may output the stored pixel values. The data output circuit 180 may include a plurality of column memories 181 and/or a column decoder 182, etc. The column memory 181 stores pixel values received from the counter 170. In at least one example embodiment, each of the plurality of column memories 181 may be included in the counter 170, but is not limited thereto. The plurality of pixel values stored in the plurality of column memories 181 may be output as image data IDTA under the control of the column memory 181.

The timing controller 190 outputs a control signal to each of the row driver 120, the ramp signal generator 130, the counting code generator 135, the ADC circuit 150, and/or the data output circuit 180, etc., so that the operations and/or timing of the row driver 120, the ramp signal generator 130, the counting code generator 140, the ADC circuit 150, and/or the data output circuit 180, etc., may be controlled.

The signal processor 195 may perform one or more image processing operations, such as noise reduction processing, gain adjustment, waveform shaping processing, interpolation processing, white balance processing, gamma processing, edge enhancement processing, binning, etc., and the like on image data. In at least one example embodiment, image data having a high dynamic range may be generated by merging, e.g., first image data and second image data generated based on the first comparison signal and the second comparison signal, but is not limited thereto. In at least one example embodiment, the signal processor 195 may be provided in an external processor of the image sensor 100, but is not limited thereto. According to at least one example embodiment, the first image data and the second image data based on the first comparison signal and the second comparison signal generated by comparing one pixel signal with ramp signals having different slopes may have values corresponding to different luminance, but are not limited thereto. For example, the first image data is data based on a comparison result between the first ramp signal and the pixel signal, and the second image data is data based on a comparison result between the second ramp signal and the pixel signal, and when the slope of the first ramp signal is smaller than the slope of the second ramp signal, a first luminance corresponding to the first image data may be higher than a second luminance corresponding to the second image data, but is not limited thereto.

FIG. 2 is a circuit diagram illustrating an image sensor according to at least one example embodiment.

An image sensor 100a may include at least one pixel 200a, a plurality of comparison circuits, e.g., a first comparison circuit 310 and/or a second comparison circuit 320, etc., and/or at least one ramp signal generator 130, etc. The first comparison circuit 310 may include a first comparator 161, a first gain circuit 330, and/or at least one capacitor C, etc., and the second comparison circuit 320 may include a second comparator 162, a second gain circuit 340, and/or at least one capacitor C, etc., but the example embodiments are not limited thereto. The image sensor 100a may further include other components described with reference to FIG. 1, but is not limited thereto.

The pixel 200a may include at least one photodiode PD, a plurality of transistors such as a transmission transistor TX, a reset transistor RX, a driving transistor DX, and/or a selection transistor SX, etc. A capacitor, for example, a parasitic capacitor, may be formed by a floating diffusion node FD, but the example embodiments are not limited thereto.

The photodiode PD may convert light incident from the outside into an electrical signal. The photodiode PD generates electric charge according to and/or based on light intensity. The amount of charge generated by the photodiode PD may be variable according to and/or based on an image capturing environment (e.g., low or high illumination, etc.). For example, the amount of charge generated by the photodiode PD in a high-illumination environment may reach the full well capacity (FWC) of the photodiode PD, but not in a low-illumination environment, etc.

The transmission transistor TX, the reset transistor RX, the driving transistor DX, and/or selection transistor SX may operate in response to and/or based on control signals provided from the row driver 120, for example, a reset control signal RG, a transmission control signal TG, and/or a selection signal SEL, etc.

For example, the reset transistor RX may be turned on in response to and/or based on the reset control signal RG having an active level to reset the floating diffusion node FD based on the pixel power supply voltage VDD, but is not limited thereto.

When the transmission transistor TX is turned on in response to and/or based on the transmission control signal TG having an active level, charges generated by the photodiode PD may transfer to the floating diffusion node FD, and charges may accumulate in a capacitor formed at the floating diffusion node FD. Charges that accumulated in the floating diffusion node FD may generate a voltage. In other words, the charge accumulated in the floating diffusion node FD may be converted into a voltage.

The driving transistor DX may operate as a source follower based on a bias current generated by the current source CS connected to the column line CL, and may output a voltage corresponding to the voltage of the floating diffusion node FD as a pixel voltage through the selection transistor SX, etc. The pixel voltage may be referred to as a pixel signal PXS.

The selection transistor SX may select the pixel 200a. The selection transistor SX may be turned on in response to the selection signal SEL having an active level to output the pixel signal PXS (and/or current) output from the driving transistor DX to the column line CL. The pixel signal PXS may be provided to the first comparator 161 and the second comparator 162 through the column line CL, but is not limited thereto.

The pixel 200a may be connected to the first comparator 161 and the second comparator 162 through the column line CL connected to the selection transistor SX, but is not limited thereto.

The first gain circuit 330 may be connected between the first input node IPL1 of the first comparator 161 and the ramp signal generator 130, but is not limited thereto. The first gain circuit 330 may further include a first capacitor C1 connected to the first input node IPL1 and a second capacitor C2 connected between the first input node IPL1 and ground, but is not limited thereto.

According to at least one example embodiment, the voltage of the reference ramp signal RAMP input through the first capacitor C1 is divided by the second capacitor C2 included in the first gain circuit 330 so that the offset and slope of the first ramp signal RAMP1 input to the first input node IPL1 may be smaller than the offset and slope of the reference ramp signal RAMP, but the example embodiments are not limited thereto. Accordingly, the first comparator 161 may receive the first ramp signal RAMP1 having a smaller offset and slope than the reference ramp signal RAMP through the first input node IPL1. In this case, the ratio of the capacitance of the second capacitor C2 to the capacitance of the first capacitor C1 and the offset and slope of the first ramp signal RAMP1 may be inversely proportional to each other, but the example embodiments are not limited thereto. For example, as the ratio of the capacitance of the second capacitor C2 to the capacitance of the first capacitor C1 increases, compared to the offset and slope of the reference ramp signal RAMP, the offset of the first ramp signal RAMP1 may be smaller and the slope may be smaller (e.g., gentler, lower, etc.).

A capacitor C may be connected to the second input node INL1 of the first comparator 161, and the first comparator 161 may receive the pixel signal PXS through the capacitor C, but the example embodiments are not limited thereto.

The first comparator 161 may compare the pixel signal PXS and the first ramp signal RAMP1 received through the capacitors C1 and C, and may generate a first comparison signal COMP1 based on the results of the comparison (e.g., based on the pixel signal PXS and the first ramp signal RAMP1). The first comparison signal COMP1 may include a first reset comparison signal obtained by and/or generated by comparing the reset signal received as the pixel signal PXS with the first ramp signal RAMP1, and may include a first image comparison signal obtained by and/or generated by comparing the image signal received as the pixel signal PXS with the first ramp signal RAMP1.

As mentioned above, the first ramp signal RAMP1 having a slope smaller than that of the reference ramp signal RAMP generated by the ramp signal generator 130 by the second capacitor C2 is input to the first comparator 161 through the first capacitor C1. A capacitor through which an input signal (e.g., ramp signal) passes, such as the first capacitor C1, may be referred to as a voltage input capacitor, and a capacitor which divides the voltage of the input node (e.g., first input node IPL1), such as the second capacitor C2, may be referred to as a voltage dividing capacitor.

The second gain circuit 340 may be connected between the third input node IPL2 of the second comparator 162 and the ramp signal generator 130, but is not limited thereto. The second gain circuit 340 may include a third capacitor C3 connected to the third input node IPL2. The second comparator 162 may receive the second ramp signal RAMP2 based on the reference ramp signal RAMP through the third capacitor C3, but is not limited thereto. A capacitor C may be connected to the fourth input node INL2 of the second comparator 162, and the second comparator 162 may receive the pixel signal PXS through the capacitor C. The second comparator 162 may compare the pixel signal PXS and the second ramp signal RAMP2 received through the capacitors C3 and C, and may generate a second comparison signal COMP2. The second comparison signal COMP2 may include a second reset comparison signal obtained by and/or generated by comparing the reset signal received as the pixel signal PXS with the second ramp signal RAMP2, and a second image comparison signal obtained by and/or generated by comparing the image signal received as the pixel signal PXS with the second ramp signal RAMP2, but the example embodiments are not limited thereto.

Referring to FIG. 2, a voltage dividing capacitor may not be connected to the third input node IPL2 of the second comparator 162, or in other words, a voltage dividing capacitor may be omitted from the second gain circuit 340, but the example embodiments are not limited thereto. Accordingly, the second ramp signal RAMP2 may have the same offset and slope as the reference ramp signal RAMP generated by the ramp signal generator 130.

According to at least one example embodiment, a plurality of capacitors, e.g., the capacitors C1, C3, and C, etc., may be connected to the first input node IPL1 and the second input node INL1 of the first comparator 161, and the third input node IPL2 and/or the fourth input node INL2 of the second comparator 162, that is, a plurality of voltage input capacitors may be connected to the input nodes of the first comparator 161 and the second comparator 162, and the first comparator 161 may receive a direct current (DC)-blocked first ramp signal RAMP1 and a pixel signal PXS, and the second comparator 162 may receive the DC-blocked second ramp signal RAMP2 and the pixel signal PXS, but the example embodiments are not limited thereto.

The first counter 171 may generate the first pixel value PV1 based on the first comparison signal COMP1 by counting the counting clock signal CLK until the time point at which the polarity (e.g., logic value) of the first comparison signal COMP1 changes, and the second counter 172 may generate the second pixel value PV2 based on the second comparison signal COMP2 by counting the counting clock signal CLK until the time point at which the polarity (e.g., logic value) of the second comparison signal COMP2 changes, but the example embodiments are not limited thereto.

As described above, the first ramp signal RAMP1 and the second ramp signal RAMP2 are signals generated based on the same reference ramp signal RAMP, and the reference ramp signal RAMP is a signal generated by a single ramp signal generator 130, but is not limited thereto. Depending on whether a voltage dividing capacitor is connected to the input nodes of the first comparator 161 and the second comparator 162, offsets and slopes of ramp signals (e.g., first ramp signal RAMP1 and second ramp signal RAMP2, etc.) input to the first comparator 161 and the second comparator 162 may be different. Accordingly, the image sensor 100a generates a first ramp signal RAMP1 and a second ramp signal RAMP2 having different offsets and slopes using a single ramp signal generator 130, compares the pixel signal PXS with the first ramp signal RAMP1 and the second ramp signal RAMP2, respectively, and samples the pixel signal PXS output from one pixel based on the comparison result of the pixel signal PXS with the first ramp signal RAMP1 and the second ramp signal RAMP2, etc.

Figure 3:
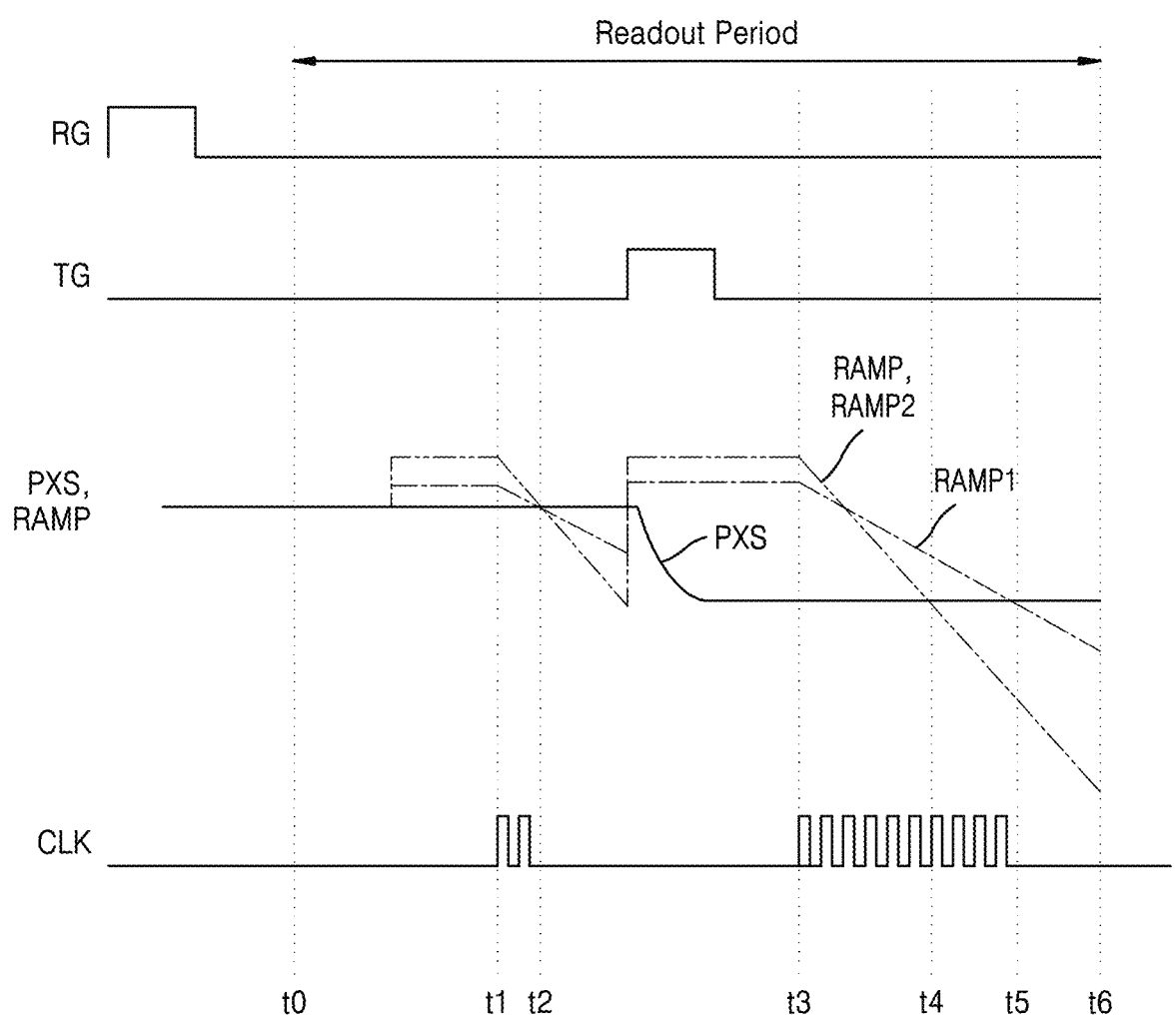
FIG. 3 is a timing diagram illustrating an operation of an image sensor according to at least one example embodiment.

FIG. 3 is a timing diagram illustrating an operation of an image sensor according to at least one example embodiment.

FIG. 3 is a timing diagram of the image sensor 100a including the pixel 200a, the first gain circuit 330, and the second gain circuit 340 of FIG. 2, however the example embodiments are not limited thereto. FIG. 3 may be described with reference to FIG. 2, and redundant description may be omitted.

As described with reference to FIG. 2, the reset transistor RX may be turned on in response to and/or based on the reset control signal RG, and when the reset transistor RX is turned on it may reset the floating diffusion node FD, and in response to the transmission control signal TG, the transmission transistor TX is turned on so that charges generated and accumulated in the photodiode PD may be transmitted to the floating diffusion node FD, and accordingly, the voltage of the floating diffusion node FD may change.

The pixel signal PXS may be output from the pixel 200a during the read period (e.g., from time point t0 to time point t6, etc.). In other words, during the read period, the pixel 200a outputs the pixel signal PXS through the column line, and the first comparator 161 may generate a first comparison signal COMP1 based on the pixel signal PXS to the first ramp signal RAMP1, e.g., by comparing the pixel signal PXS to the first ramp signal RAMP1, and the second comparator may generate a second comparison signal COMP2 based on the pixel signal PXS to the second ramp signal RAMP2, e.g., by comparing the pixel signal PXS to the second ramp signal RAMP2. The first counter 171 may receive the first comparison signal COMP1 from the first comparator 161 and generate a first pixel value PV1 based on the first comparison signal COMP1, and the second counter 172 may receive the second comparison signal COMP2 from the second comparator 162 and generate the second pixel value PV2 based on the second comparison signal COMP2. The first comparator 161 and the second comparator 162 may simultaneously operate during a first period, e.g., from time point t1 to time point t2, and/or may operate simultaneously during a second period, e.g., from time point t3 to time point t6, but the example embodiments are not limited thereto.

As described above, since the first gain circuit 330 includes a voltage dividing capacitor (e.g., the second capacitor C2 in FIG. 2), the offset and slope of the first ramp signal RAMP1 may be smaller than those of the reference ramp signal RAMP, but is not limited thereto. On the other hand, since the second gain circuit 340 does not include a voltage dividing capacitor, the reference ramp signal RAMP and the second ramp signal RAMP2 may have the same slope and offset during the read period, but is not limited thereto.

The pixel signal PXS may include a reset signal and an image signal, but is not limited thereto. Here, the reset signal may be a pixel signal PXS from, e.g., time point t1 to time point t2, and the image signal may be the pixel signal PXS, e.g., at time point t3 at which the pixel signal PXS falls after time point t2 and no longer falls, but is not limited thereto.

Referring to FIG. 3, since the first ramp signal RAMP1 and the second ramp signal RAMP2 fall starting from time point t1, and the levels of the reset signal, the first ramp signal RAMP1, and the second ramp signal RAMP2 become the same at time point t2, the first comparator 161 compares the first ramp signal RAMP1 to the reset signal to generate a first reset comparison signal as the first ramp signal RAMP1, and the second comparator 162 may generate a second reset comparison signal as the second ramp signal RAMP2 by comparing the second ramp signal RAMP2 with the reset signal, but the example embodiments are not limited thereto.

The first counter 171 may receive a first reset comparison signal from the first comparator 161 and count the counting clock signal CLK based on the first reset comparison signal. For example, since the first reset comparison signal transitions at time point t2, the counting clock signal CLK counted by the first counter 171 from time point t1 to time point t2 may be 2, but is not limited thereto.

The second counter 172 may receive the second reset comparison signal from the second comparator 162 and count the counting clock signal CLK based on the second reset comparison signal. For example, since the second reset comparison signal transitions at time point t2, the counting clock signal CLK counted by the second counter 172 from time point t1 to time point t2 may be 2, but is not limited thereto.

Referring to FIG. 3, since the first ramp signal RAMP1 falls starting from time point t3 and the level of the image signal and the first ramp signal RAMP1 become the same at time point t5, the first comparator 161 may generate a first image comparison signal as the first comparison signal COMP1 by comparing the first ramp signal RAMP1 with the image signal, but the example embodiments are not limited thereto.

The first counter 171 may receive the first image comparison signal from the first comparator 161 and count the counting clock signal CLK based on the first image comparison signal. For example, since the first image comparison signal transitions at time point t5, a value obtained by counting the counting clock signal CLK by the first counter 171 from time point t3 to time point t5 may be 10, but is not limited thereto.

Referring to FIG. 3, since the second ramp signal RAMP2 falls starting from time point t3 and the level of the image signal and the second ramp signal RAMP2 become the same at time point t4, the second comparator 162 may generate a second image comparison signal as the second comparison signal COMP2 by comparing the second ramp signal RAMP2 to the image signal, but the example embodiments are not limited thereto.

The second counter 172 may receive the second image comparison signal from the second comparator 162 and count the counting clock signal CLK based on the second image comparison signal. For example, since the second image comparison signal transitions at time point t4, the counting clock signal CLK counted by the second counter 172 from time point t3 to time point t4 may be 6, but is not limited thereto.

As described above with reference to FIG. 2, the first counter 171 and the second counter 172 may output a pixel value obtained by removing the count value of the reset comparison signal from the count value based on the image comparison signal. Referring to the above example, the first pixel value PV1 generated by the first counter 171 based on the first comparison signal COMP1 generated by the first comparator 161 by comparing the pixel signal PXS with the first ramp signal RAMP may be 8 (e.g., 10-2), and the second pixel value PV2 generated by the second counter 172 based on the second comparison signal COMP2 generated by the second comparator 162 by comparing the pixel signal PXS with the second ramp signal RAMP2 may be 4 (e.g., 6-2), but the example embodiments are not limited thereto.

Therefore, since different pixel values may be obtained using the first ramp signal RAMP1 and the second ramp signal RAMP2 based on the same reference ramp signal RAMP, an image with a high dynamic range may be obtained by obtaining a dual slope gain, but the example embodiments are not limited thereto.

Figure 4:
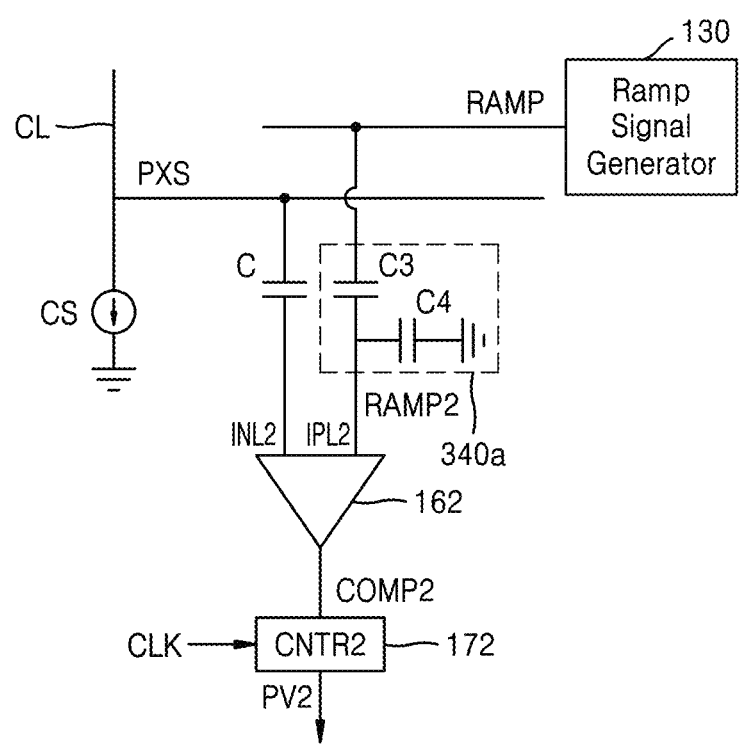
FIG. 4 is a circuit diagram of a second gain circuit connected to a second comparator according to at least one example embodiment.

FIG. 4 is a circuit diagram of a second gain circuit connected to a second comparator according to at least one example embodiment.

FIG. 3 may be described with reference to FIG. 2, and redundant description may be omitted.

A second gain circuit 340a may further include a fourth capacitor C4 connected between the third input node IPL2 and the ground, but the example embodiments are not limited thereto. The fourth capacitor C4 is a voltage dividing capacitor.

The offset and slope of the second ramp signal RAMP2 based on the reference ramp signal RAMP input through the third capacitor C3 by the fourth capacitor C4 included in the second gain circuit 340a may be smaller than the offset and slope of the signal RAMP, but is not limited thereto. In this case, the ratio of the capacitance of the fourth capacitor C4 to the capacitance of the third capacitor C3 and the offset and slope of the second ramp signal RAMP2 may be inversely proportional to each other.

When the ratio of the capacitance of the second capacitor C2 to the capacitance of the first capacitor C1 included in the first gain circuit 330 of, for example, FIG. 2, and the ratio of the capacitance of the fourth capacitor C4 to the capacitance of the third capacitor C3 included in the second gain circuit 340a of, for example, FIG. 3, are different from each other, the offset and slope of the first ramp signal RAMP1 in FIG. 2 and the offset and slope of the second ramp signal RAMP2 in FIG. 3 may be different from each other, but are not limited thereto.

Thus, when the first gain circuit 330 of FIG. 2 is connected between the first input node IPL1 of the first comparator 161 and the ramp signal generator 130, and the second gain circuit 340a of FIG. 3 is connected between the third input node IPL2 of the second comparator 162 and the ramp signal generator 130, the offsets and slopes of the reference ramp signal RAMP, the first ramp signal RAMP1, and/or the second ramp signal RAMP2 may be different from each other, etc. Therefore, by comparing one pixel signal PXS with the first ramp signal RAMP1 and the second ramp signal RAMP2 having different offsets and slopes, respectively, since different comparison signals (e.g., RAMP1 in FIG. 2 and RAMP2 in FIG. 4, etc.) may be obtained based on one pixel signal PXS, an image having a high dynamic range based on different comparison signals (e.g., RAMP1 in FIG. 2 and RAMP2 in FIG. 4, etc.) may be obtained.

Figure 5:
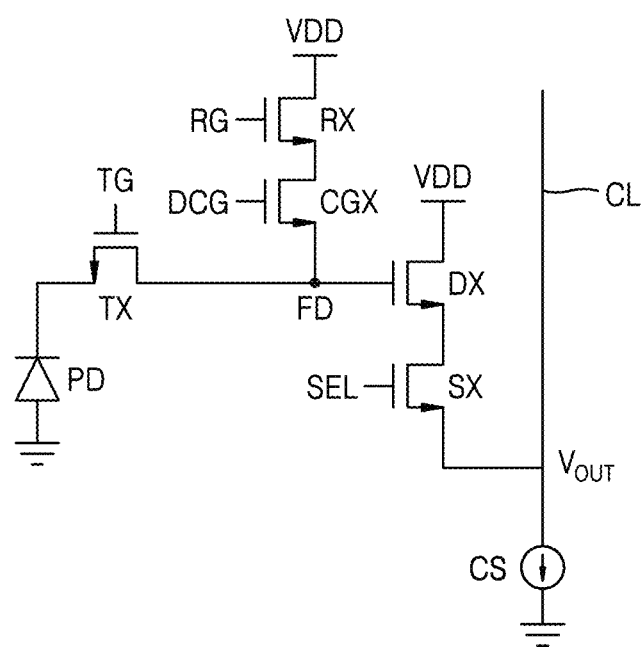
FIG. 5 is a circuit diagram illustrating an implementation example of a pixel according to at least one example embodiment.

FIG. 5 is a circuit diagram illustrating an interface circuit according to at least one example embodiment.

The pixel 200b of FIG. 5 may be a modified example of the pixel 200a of FIG. 2, but the example embodiments are not limited thereto. Accordingly, the pixel 200b may be described with reference to the pixel 200a of FIG. 2, and redundant description may be omitted.

Compared to the pixel 200a of FIG. 2, the pixel 200b of FIG. 5 may further include a conversion gain transistor CGX, but the example embodiments are not limited thereto.

The conversion gain transistor CGX may operate in response to and/or based on the gain control signal DCG provided from the row driver 120.

The reset transistor RX may be turned on in response to and/or based on the reset control signal RG applied to the gate terminal, and may reset the floating diffusion node FD based on the pixel power voltage VDD. At this time, the conversion gain transistor CGX is turned on together with the reset transistor RX based on the gain control signal DCG received at the gate terminal, so that the pixel power supply voltage VDD may be applied to the floating diffusion node FD, thereby causing the floating diffusion node FD to be reset.

When the transmission transistor TX is turned on in response to and/or based on the transmission control signal TG having an active level, the photocharges generated by the photodiode PD may transfer to the floating diffusion node FD and accumulate in the floating diffusion node FD, and the photocharges accumulated in the floating diffusion node FD may generate a voltage. In other words, the charge accumulated in the floating diffusion node FD may be converted into a voltage. The conversion gain (e.g., the unit of conversion gain may be, for example, uV/e) is determined by the capacitance of the floating diffusion node FD and may be inversely proportional to the size of the capacitance. In other words, when the capacitance of the floating diffusion node FD increases, the conversion gain decreases, and when the capacitance decreases, the conversion gain increases.

Here, the conversion gain refers to a rate at which charges that accumulated in the floating diffusion node FD are converted into voltage.

The pixel 200b may operate in a low conversion gain mode in which the capacitance of the floating diffusion node FD is large (hereinafter referred to as LCG mode) or a high conversion gain mode in which the capacitance of the floating diffusion node FD is small (hereinafter, referred to as HCG gain mode), but is not limited thereto. According to at least one example embodiment, if the charge accumulated at the floating diffusion node FD is the same, the voltage of the floating diffusion node FD in the HCG gain mode is higher than the voltage of the floating diffusion node FD in the LCG gain mode.

In the image based on the first pixel signal (e.g., PXS1 in FIG. 6) generated as the pixel 200b operates in the HCG mode, dark areas are clearly expressed, and in an image based on the second pixel signal (e.g., PXS2 in FIG. 6) generated as the pixel 200b operates in the LCG mode, a bright area may be clearly expressed, but the example embodiments are not limited thereto.

In at least one example embodiment, within one frame (e.g., image frame) the pixel array 110 receives light once (e.g., one exposure of the image sensor 100, etc.) and is scanned by a signal processor 195, each of the plurality of pixels PX may continuously operate in the HCG gain mode and the LCG gain mode in a corresponding readout period (and/or referred to as a horizontal period), and accordingly, the first pixel signal PXS1 and the second pixel signal PXS2 may be generated during one frame period (e.g., one desired time period, etc.). By generating one image based on the first pixel signal PXS1 and the second pixel signal PXS2 by the signal processor 195 (e.g., see FIG. 1) described with reference to FIG. 1, an image having a high dynamic range in which a bright area (e.g., high luminance area) and a dark area (e.g., low luminance area) are clearly obtained, sensed, and/or implemented may be generated, but the example embodiments are not limited thereto. In this way, the dual conversion gain within one frame may be referred to as intra-scene dual conversion gain, and hereinafter, the dual conversion gain referred to in the example embodiments of the inventive concepts refers to an intra-scene dual conversion gain.

The conversion gain transistor CGX may be turned on or off based on the gain control signal CGS received at the gate terminal, and when the conversion gain transistor CGX is turned off, the floating diffusion node FD has a capacitance based on a capacitor formed by the floating diffusion node FD, and when the conversion gain transistor CGX is turned on, a capacitor by the conversion gain transistor CGX is connected to the floating diffusion node FD so that the floating diffusion node FD has a larger capacitance, but is not limited thereto. Accordingly, the conversion gain when the conversion gain transistor CGX is turned off may be higher than the conversion gain when the conversion gain transistor CGX is turned on. When the gain control transistor CX is turned off, this may be referred to as an HCG mode, and when the gain control transistor CX is turned on, this may be referred to as an LCG mode.

The pixel signal PXS output from the pixel 200b through the column line CL in the HCG mode may be referred to as a first pixel signal PXS1, and the pixel signal PXS output through the column line CL in the LCG mode may be referred to as a second pixel signal PXS2.

Figure 6:
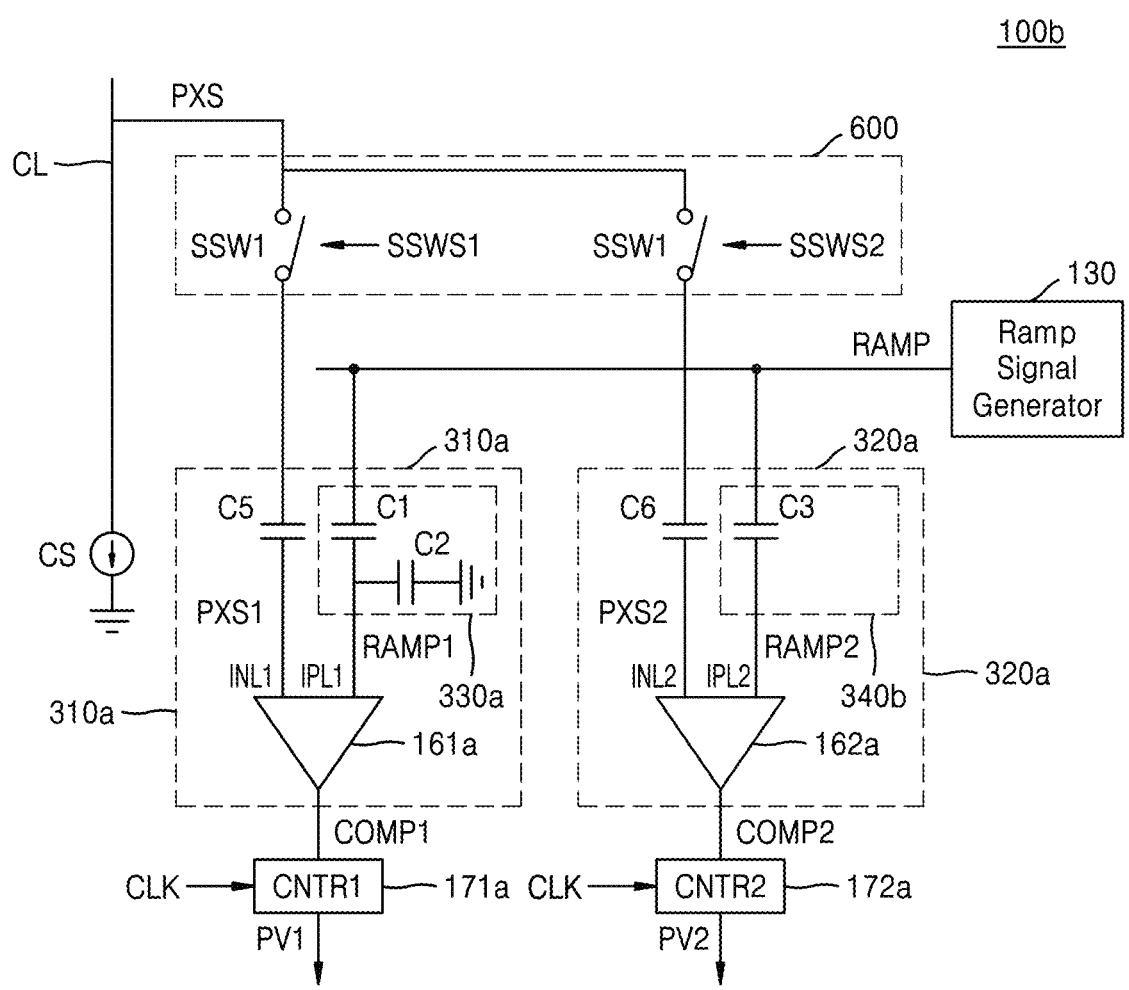
FIG. 6 is a circuit diagram illustrating an image sensor according to at least one example embodiment.

FIG. 6 is a circuit diagram illustrating an image sensor according to at least one example embodiment.

FIG. 6 may be described with reference to FIGS. 2 and 5, and redundant descriptions may be omitted, but the example embodiments are not limited thereto.

The image sensor 100b of FIG. 6 may include a pixel 200b (e.g., see FIG. 5), a plurality of comparison circuits, e.g., a first comparison circuit 310a and a second comparison circuit 320a, a selection circuit 600, and/or a ramp signal generator 130, etc., but the example embodiments are not limited thereto, and for example, the image sensor 100b may include a greater or lesser number of constituent components. The first comparison circuit 310a may include a first comparator 161a, a first gain circuit 330a, and/or a fifth capacitor C5, etc., and the second comparison circuit 320a may include a second comparator 162a, a second gain circuit 340b, and/or a sixth capacitor C6, etc., but are not limited thereto. The image sensor 100b may further include other components described with reference to FIG. 1, but the example embodiments are not limited thereto.

The column line of FIG. 6 may be connected to the pixel 200b having the dual conversion gain described with reference to FIG. 5, but the example embodiments are not limited thereto.

The pixel 200b may output the first pixel signal PXS1 as a pixel signal through the column line CL while in the HCG mode, and may output the second pixel signal PXS2 as a pixel signal through the column line CL while in the LCG mode. The first pixel signal PXS1 may include a reset signal and an image signal according to and/or based on the HCG mode, and the second pixel signal PXS2 may include a reset signal and an image signal according to and/or based on the LCG mode, but the example embodiments are not limited thereto.

The image sensor 100b of FIG. 6 may further include a selection circuit 600, but the example embodiments are not limited thereto. The selection circuit 600 may include a first selection switch SSW1 connected between the fifth capacitor C5 connected to the second input node INL1 of the first comparator 161a and the pixel 200b, and a second selection switch SSW2 connected between the sixth capacitor C6 connected to the fourth input node INL2 of the second comparator 162a and the pixel 200b, etc.

The timing controller 190 may generate and provide selection switch control signals SSWS1 and SSWS2 to control the operation of the selection circuit 600, etc.

When the first selection switch control signal SSWS1 having an active level is applied to the first selection switch SSW1, the first selection switch SSW1 is turned on so that the second input node INL1 of the first comparator 161a may receive the pixel signal PXS through the column line CL. When the second selection switch control signal SSWS2 having an active level is applied to the second selection switch SSW2, the second selection switch SSW2 is turned on so that the fourth input node INL2 of the second comparator 162a may receive the pixel signal PXS through the column line CL.

The timing controller 190 may provide a first selection switch control signal SSWS1 having an active level and a second selection switch control signal SSWS2 having an inactive level to the selection circuit 600 in the HCG mode. Accordingly, the first pixel signal PXS1 may be received at the pixel signal PXS at the second input node INL1 of the first comparator 161a, and the first pixel signal PXS1 may not be received at (e.g., is not transmitted to) the fourth input node INL2 of the second comparator 162a. In addition, by the first gain circuit 330a including the second capacitor C2, which is a voltage dividing capacitor, the first ramp signal RAMP1 having a smaller offset and slope than the reference ramp signal RAMP may be received by the first input node IPL1 of the first comparator 161a. The first comparator 161a may compare the first pixel signal PXS1 to the first ramp signal RAMP1 and output a first comparison signal COMP1 based on the results of the comparison by the first comparator 161a. In other words, the first comparator 161a may generate the first comparison signal COMP1 based on the first pixel signal PXS1 and the first ramp signal RAMP1.

The timing controller 190 may provide a second selection switch control signal SSWS2 having an active level and a first selection switch control signal SSWS1 having an inactive level in the LCG mode. Accordingly, the second pixel signal PXS2 may be received as the pixel signal PXS at the fourth input node INL2 of the second comparator 162a, and the second pixel signal PXS2 may not be received at (e.g., is not transmitted to) the second input node INL1 of the first comparator 161a. Also, the second ramp signal RAMP2 having the same offset and slope as the reference ramp signal RAMP may be received by the third input node IPL2 of the second comparator 162a. The second comparator 162a may compare the second pixel signal PXS2 to the second ramp signal RAMP2 and output a second comparison signal COMP2 based on results of the comparison. In other words, the second comparator 162a may generate the second comparison signal COMP2 based on the second pixel signal PXS2 and the second ramp signal RAMP2.

The first counter 171a counts the counting clock signal CLK until the time point at which the polarity (e.g., logic value, etc.) of the first comparison signal COMP1 changes (e.g., the time point at which the level transitions) to generate a first pixel value PV1 based on the first comparison signal COMP1, and the second counter 172a counts the counting clock signal CLK until the time point at which the polarity (e.g., logic value, etc.) of the second comparison signal COMP2 changes to generate the second pixel value PV2 based on the second comparison signal COMP2, but the example embodiments are not limited thereto.

That is, the first comparator 161a compares the first pixel signal PXS1 having a relatively high conversion gain generated in the HCG mode with the first ramp signal RAMP1 having a relatively gentle slope with a second ramp signal RAMP2, and the second comparator 162a compares the second pixel signal PXS2 having a relatively low conversion gain generated in the LCG mode with the second ramp signal RAMP2, thereby generating an image having a higher dynamic range than when an image is generated using only one ramp signal (e.g., a reference ramp signal).

Figure 7:
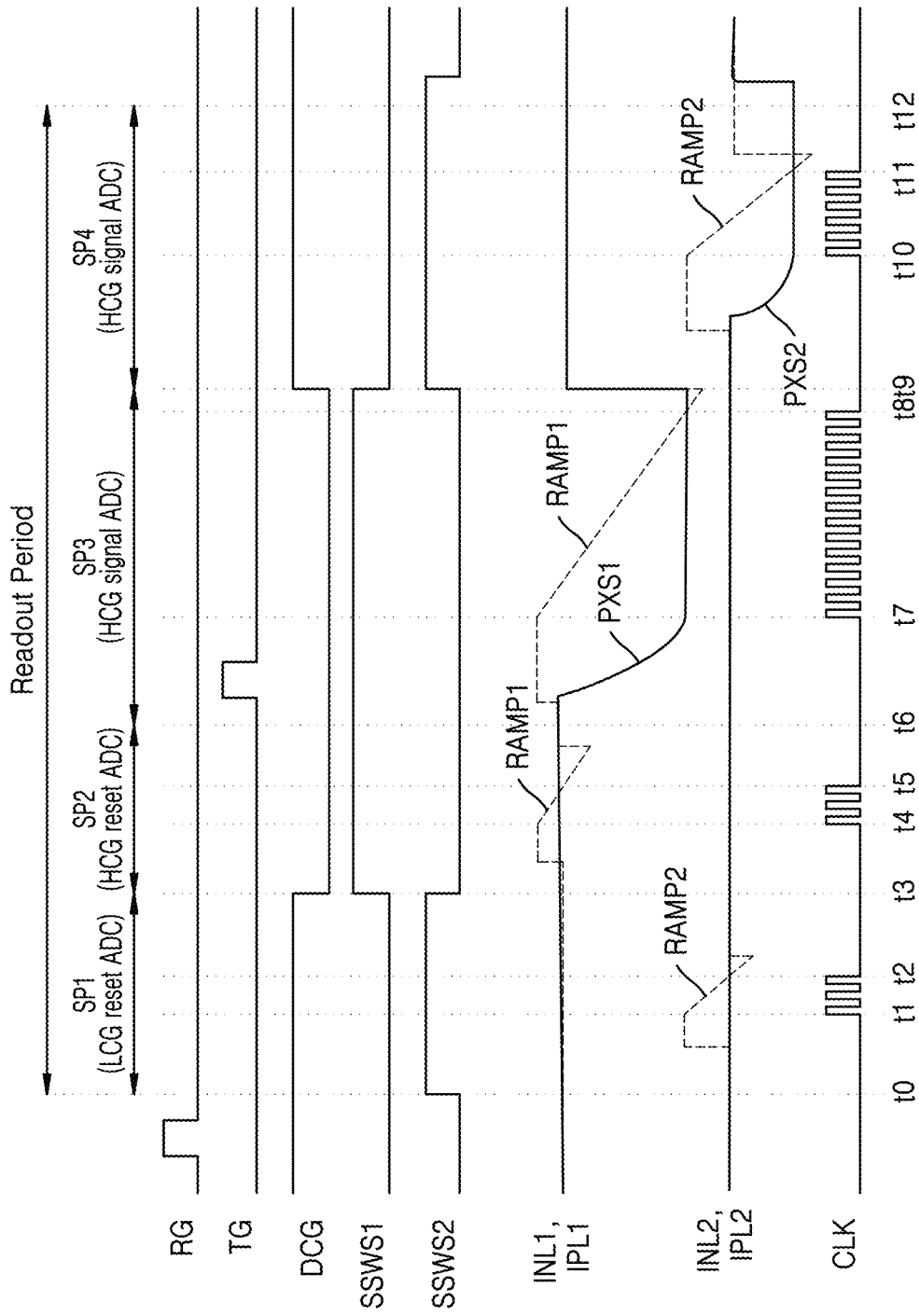
FIG. 7 is a timing diagram illustrating an operation of an image sensor according to at least one example embodiment.

FIG. 7 is a timing diagram illustrating an operation of an image sensor according to at least one example embodiment.

FIG. 7 is a timing diagram illustrating operations of an image sensor including the pixel 200b of FIG. 5, the selection circuit 600 of FIG. 6, the first gain circuit 330a, and the second gain circuit 340b. FIG. 7 may be described with reference to FIGS. 5 and 6, and redundant descriptions may be omitted, but the example embodiments are not limited thereto.

The pixel signal PXS may be read from the pixel 200b during the read period (e.g., from time point t0 to time point t12, etc.), but is not limited thereto. In other words, during the read period, the pixel 200b may operate in both HCG mode and LCG mode, and the first pixel signal PXS1 as the pixel signal PXS in the HCG mode and the second pixel signal PXS2 as the pixel signal PXS in the LCG mode may be output through the column line. The first comparator 161a may generate a first comparison signal COMP1 by comparing the first pixel signal PXS1 to the first ramp signal RAMP1, and the second comparator 162a may generate a second comparison signal COMP2 by comparing the second pixel signal PXS2 to the second ramp signal RAMP2, etc. The first counter 171a may generate a first pixel value PV1 based on the first comparison signal COMP1, and the second counter 172a may generate the second pixel value PV2 based on the second comparison signal COMP2, etc.

The first comparator 161a may operate during a desired period between, e.g., time point t3 and time point t9, etc., and the second comparator 162a may operate during a desired period between, e.g., time point t0 and time point t3, etc., and a desired period between, e.g., time point t9 and time point t12, etc., but are not limited thereto. That is, the first comparator 161a and the second comparator 162a may selectively operate during desired sub-periods within the read period. For example, while operating in the HCG mode, the first comparator 161a may operate, but the second comparator 162a may not operate, and while operating in the LCG mode, the second comparator 162a may operate, but the first comparator 161a may not operate, but the example embodiments are not limited thereto.

In the first period SP1 (e.g., the sub-period from time point t0 to time point t3) of the read period, the gain control signal DCG having an active level is applied to the conversion gain transistor CGX, so that the pixel 200b operates in LCG mode, the first selection switch control signal SSWS1 may have an inactive level, and the second selection switch control signal SSWS2 may have an active level, etc. Therefore, the first selection switch SSW1 is turned off and the second selection switch SSW2 is turned on, so that in the LCG mode, the second comparator 162a receives the LCG reset signal output through the column line CL through the sixth capacitor C6 and receives the second ramp signal RAMP2 through the third capacitor C3. The second comparator 162a may generate a second reset comparison signal as the second comparison signal COMP2 by comparing the LCG reset signal to the second ramp signal RAMP2, etc.

Referring to FIG. 7, since the second ramp signal RAMP2 falls starting from, e.g., time point t1, and the level of the LCG reset signal and the second ramp signal RAMP2 become the same at time point t2, the second comparator 162a may generate a second reset comparison signal transitioning at, e.g., time point t2, and the second counter 172a may receive the second reset comparison signal and count the counting clock signal CLK based on the second reset comparison signal, but is not limited thereto. For example, the value obtained by counting the counting clock signal CLK from time point t1 to time point t2 by the second counter 172a may be 3, but the example embodiments are not limited thereto.

In the second period SP2 (e.g., the sub-period from time point t3 to time point t6, etc.) of the read period, the gain control signal DCG having an inactive level is applied to the conversion gain transistor CGX, so that the pixel 200b operates in HCG mode, the first selection switch control signal SSWS1 may have an active level, and the second selection switch control signal SSWS2 may have an inactive level. Therefore, the first selection switch SSW1 is turned on and the second selection switch SSW2 is turned off, such that in the HCG mode, the first comparator 161a may receive the HCG reset signal output through the column line CL through the fifth capacitor C5, and may receive the first ramp signal RAMP1 through the first capacitor C1 included in the first gain control circuit 330a, etc. The gain control circuit 330a further includes a second capacitor C2 connected between the first input node IPL1 and the ground, and since the voltage of the reference ramp signal RAMP is divided by the second capacitor C2, the offset and slope of the first ramp signal RAMP1 may be smaller than those of the reference ramp signal RAMP, etc. The first comparator 161a may generate a first reset comparison signal by comparing the HCG reset signal to the first ramp signal RAMP1.

Referring to FIG. 7, since the first ramp signal RAMP1 falls starting from, e.g., time point t4, and the level of the HCG reset signal and the first ramp signal RAMP1 become the same at, e.g., time point t5, the first comparator 161a generates a first reset comparison signal transitioning at, e.g., time point t4, and the first counter 171a may receive the first reset comparison signal and count the counting clock signal CLK based on the first reset comparison signal, but the example embodiments are not limited thereto. For example, the value obtained by counting the counting clock signal CLK from time point t4 to time point t5 by the first counter 171a may be 3, but is not limited thereto.

In the third period SP3 (e.g., the sub-period from time point t6 to time point t9, etc.) of the read period, the gain control signal DCG having an inactive level is applied to the conversion gain transistor CGX, so that the pixel 200b operates in HCG mode, the first selection switch control signal SSWS1 may have an active level, and the second selection switch control signal SSWS2 may have an inactive level. Therefore, the first selection switch SSW1 is turned on and the second selection switch SSW2 is turned off, such that in the HCG mode, the first comparator 161a may receive the HCG image signal output through the column line CL through the fifth capacitor C5 and receive the first ramp signal RAMP1 through the first capacitor C1 included in the first gain control circuit 330a, etc. The first comparator 161a may generate a first image comparison signal by comparing the HCG image signal to the first ramp signal RAMP1.

Referring to FIG. 7, since the first ramp signal falls starting from, e.g., time point t7, and the level of the HCG image signal and the first ramp signal RAMP1 become the same at, e.g., time point t8, the first comparator 161a generates a first image comparison signal transitioning at time point t8 and the first counter 171a may receive the first image comparison signal and count the counting clock signal CLK based on the first image comparison signal, but is not limited thereto. For example, the value obtained by counting the counting clock signal CLK from time point t7 to time point t8 by the first counter 171a may be 15, but the example embodiments are not limited thereto.

In the fourth period SP4 (e.g., the sub-period from time point t9 to time point t12) of the read period, the gain control signal DCG having an active level is applied to the conversion gain transistor CGX so that the pixel 200b operates in the LCG mode, the first selection switch control signal SSWS1 may have an inactive level, and the second selection switch control signal SSWS2 may have an active level. Therefore, the first selection switch SSW1 is turned off and the second selection switch SSW2 is turned on, so that in the LCG mode, the first comparator 161a may receive the LCG image signal output through the column line CL through the fifth capacitor C5. In addition, the second ramp signal RAMP2 may be received through the third capacitor C3 included in the second gain control circuit 340b. The second comparator 162a may generate a second image comparison signal by comparing the LCG image signal to the second ramp signal RAMP2, but the example embodiments are not limited thereto.

Referring to FIG. 7, since the first ramp signal falls starting from, e.g., time point t7, and the level of the HCG image signal and the first ramp signal RAMP1 become the same at, e.g., time point t8, the first comparator 162a generates a first image comparison signal transitioning at, e.g., time point t8, and the first counter 172a may receive the first image comparison signal and count the counting clock signal CLK based on the first image comparison signal, etc. For example, the value obtained by counting the counting clock signal CLK from time point t10 to time point t11 by the second counter 172a may be 6, but is not limited thereto.

As described above with reference to FIG. 2, the first counter 171a and the second counter 172a may output a pixel value obtained by removing the count value of the reset comparison signal from the count value of the image comparison signal, but the example embodiments are not limited thereto. For example, the first pixel value PV1 generated by the first counter 171a may be 12 (e.g., 15-3), based on the first comparison signal COMP1 generated by the first comparator 161a by comparing the first pixel signal PXS1 to the first ramp signal RAMP1, and the second pixel value PV2 generated by the second counter 172a may be 3 (e.g., 6-3) based on the second comparison signal COMP2 generated by the second comparator 162a by comparing the second pixel signal PXS2 to the second ramp signal RAMP2, but the example embodiments are not limited thereto.

In a case where dual conversion gain is applied to the pixel signal PXS output from the pixel 200b, and an image having a wide dynamic range may be obtained by comparing the pixel signal PXS output from one pixel 200b with both the first and second ramp signals RAMP1 and RAMP2, etc. Meanwhile, at least one example embodiment according to the inventive concepts is not limited to the reading sequence described with reference to FIG. 7.

Figure 8A:
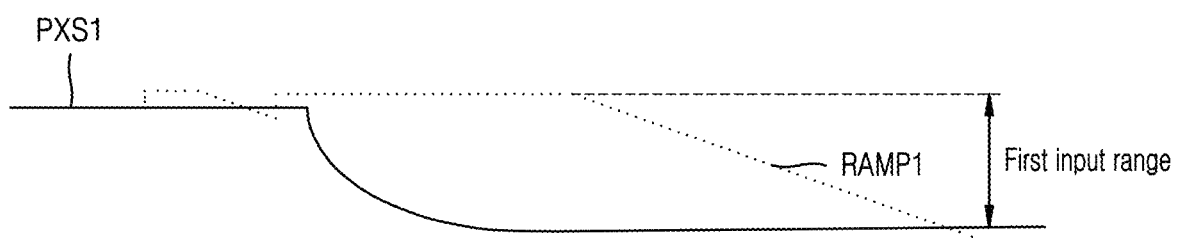
FIGS. 8A and 8B are diagrams for explaining input ranges of a first comparator and a second comparator according to some example embodiments of the inventive concepts.
Figure 8B:
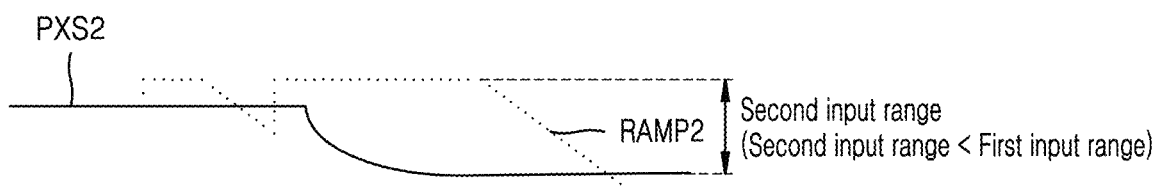

FIGS. 8A and 8B are diagrams for explaining input ranges of a first comparator and a second comparator according to some example embodiments of the inventive concepts.

FIG. 8A shows the first input range of the first comparator 161a of FIG. 6, but the example embodiments are not limited thereto. FIG. 8B shows the second input range of the second comparator 162a of FIG. 6, but the example embodiments are not limited thereto.

As described above, the first comparator 161a may receive the first pixel signal PXS1 and the first ramp signal RAMP1 through the two input nodes IPL1 and INL1, respectively, but is not limited thereto. At this time, when at least one of the first pixel signal PXS1 and the first ramp signal RAMP1 is out of the first input range (e.g., a desired input range, etc.) of the first comparator 161a, the first comparator 161a cannot operate. According to at least one example embodiment, the first input range may be set and/or configured by a manufacturer of the image sensor, a user of the image sensor, etc.

Similarly, the second comparator 162a may receive the second pixel signal PXS2 and the second ramp signal RAMP2 through the two input nodes IPL2 and INL2, respectively, and at this time, when at least one of the second pixel signal PXS2 and the second ramp signal RAMP2 is out of the second input range (e.g., desired second input range) of the second comparator 162a, the second comparator 162a cannot operate. According to at least one example embodiment, the second input range may be set and/or configured by a manufacturer of the image sensor, a user of the image sensor, etc.

Since the HCG mode has a higher conversion gain than the LCG mode, the first comparator 161a receiving the HCG image signal may have a wider input range (e.g., range of potential pixel signal values) than the second comparator 161b receiving the LCG image signal, etc.

Therefore, as described above with reference to FIGS. 6 and 7, the timing controller 190 is desired and/or required to control the selection circuit 600 (see, e.g., FIG. 6) to connect the pixel 200b to the first comparator 161a in the HCG mode and to connect the pixel 200b to the second comparator 162a in the LCG mode, but the example embodiments are not limited thereto.

Figure 9:
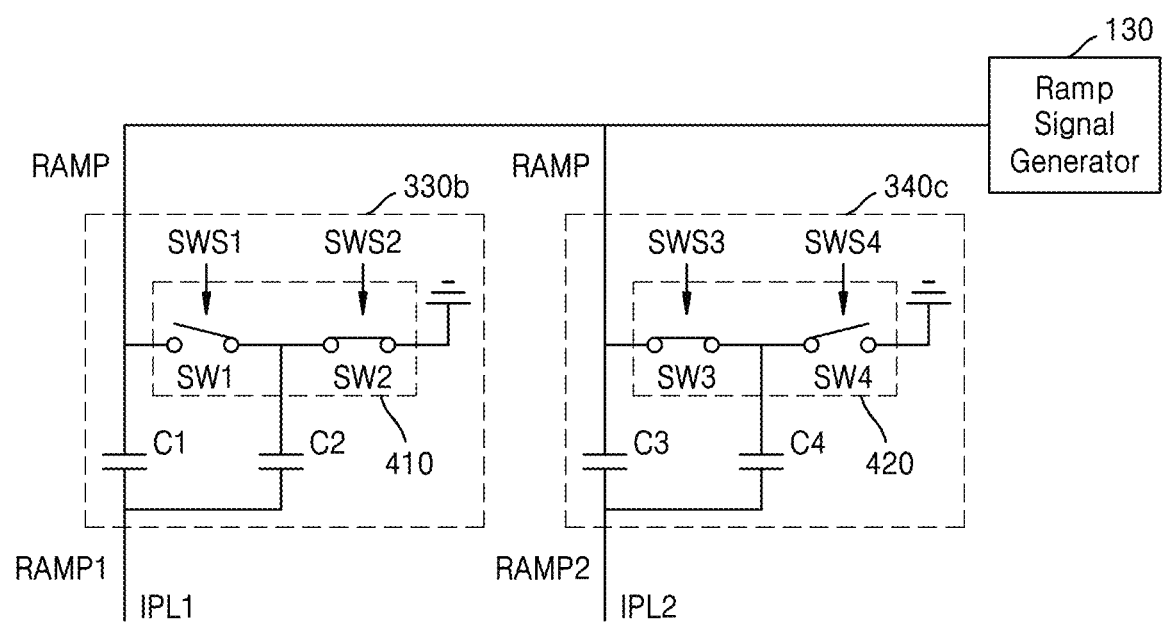
FIG. 9 is a circuit diagram illustrating a first gain circuit and a second gain circuit according to at least one example embodiment.

FIG. 9 is a circuit diagram illustrating a first gain circuit and a second gain circuit according to at least one example embodiment.

Referring to FIG. 9, the first gain circuit 330b may include a first capacitor C1, a second capacitor C2, and/or a first switching circuit 410, etc., and the first switching circuit 410 may include a first switch SW1 and a second switch SW2, etc., but the example embodiments are not limited thereto. The second gain circuit 340c may include a third capacitor C3, a fourth capacitor C4, and/or a second switching circuit 420, etc., and the second switching circuit 420 may include a third switch SW3, and/or a fourth switch SW4, etc., but the example embodiments are not limited thereto.

As described above with reference to FIG. 1, the switch signal generator 135 may provide to the first switch SW1, the second switch SW2, the third switch SW3, and the fourth switch SW4 each of the first switch control signal SWS, the second switch control signal SWS2, the third switch control signal SWS3, and the fourth switch control signal SWS4, respectively, for controlling respective operations of the first switch SW1, the second switch SW2, the third switch SW3, and the fourth switch SW4, but the example embodiments are not limited thereto. However, in other example embodiments of the inventive concepts, the first switch control signal SWS1, the second switch control signal SWS2, the third switch control signal SWS3, and the fourth switch control signal SWS4 desired and/or necessary for the switching operation of the first switching circuit 410 and the second switching circuit 420 may be received from the timing controller 190 (see, e.g., FIG. 1), but is not limited thereto.

According to and/or based on the switching operation of the first switching circuit 410, the first capacitor C1 and the second capacitor C2 may be connected in parallel between the ramp signal generator 130 and the first input node IPL1, or may be connected in series between the ramp signal generator 130 and the ground. For example, the first switch SW1 is turned off in response to the first switch control signal SWS1 having an inactive level, and the second switch SW2 is turned on in response to the second switch control signal SWS2 having an active level, such that the first capacitor C1 and the second capacitor C2 may be connected in series between the ramp signal generator 130 and the ground, etc.

Similarly, according to and/or based on the switching operation of the second switching circuit 420, the third capacitor C3 and the fourth capacitor C4 may be connected in parallel between the ramp signal generator 130 and the third input node IPL2, or may be connected in series between the ramp signal generator 130 and the ground, etc. For example, the third switch SW3 is turned on in response to the third switch control signal SWS3 having an active level, and the fourth switch SW4 is turned off in response to the fourth switch control signal SWS4 having an inactive level, so that the third capacitor C3 and the fourth capacitor C4 may be connected in parallel between the ramp signal generator 130 and the third input node IPL2, but the example embodiments are not limited thereto.

Referring to the description of FIGS. 1 to 8, in relation to the ramp signals (e.g., the first ramp signal RAMP1 and the second ramp signal RAMP2) input to the first comparator 161 (see, e.g., FIG. 2) and the second comparator 162 (see, e.g., FIG. 2), the offset and slope of the signal may differ from the reference ramp signal RAMP generated by the ramp signal generator 130 depending on the presence or absence of the voltage dividing capacitor, and the presence or absence of a voltage dividing capacitor may be determined according to the switching operation of the switching circuits 410 and 420, but the example embodiments are not limited thereto.

When the capacitor included in the gain circuits 330b and 340a is connected in series between the ramp signal generator and the ground by the switching operation of the switching circuits 410 and 420, a voltage dividing capacitor exists, and signals having a smaller offset and slope than the reference ramp signal RAMP generated by the ramp signal generator 130 by the voltage dividing capacitor may be input to the input nodes IPL1 and IPL2, etc.

When the capacitors included in the gain circuits 330b and 340a are connected in parallel between the ramp signal generator 130 and the input nodes IPL1 and IPL2 by the switching operation of the switching circuits 410 and 420, since there is no capacitor connected to ground, there is no voltage dividing capacitor. Accordingly, ramp signals having the same offset and slope as the reference ramp signal RAMP generated by the ramp signal generator 130 may be input to the input nodes IPL1 and IPL2, etc.

According to at least one example embodiment of the inventive concepts, the first switching circuit 410 may operate opposite of the second switching circuit 420 to obtain a dual slope gain, but is not limited thereto. For example, when the first capacitor C1 and the second capacitor C2 are connected in series by the switching operation of the first switching circuit 410, due to the switching operation of the second switching circuit 420, the third capacitor C3 and the fourth capacitor C4 may be connected in parallel, etc.

In another example embodiment according to the inventive concepts, when the ratio of the capacitance of the second capacitor C2 to the capacitance of the first capacitor C1 is different from the ratio of the capacitance of the fourth capacitor C4 to the capacitance of the third capacitor C3, the first switching circuit 410 and the second switching circuit 420 may operate together, but the example embodiments are not limited thereto. In this case, since the ratio of the capacitance of the second capacitor C2 to the capacitance of the first capacitor C1 is different from the ratio of the capacitance of the fourth capacitor C4 to the capacitance of the third capacitor C3, the offset and slope of both the first ramp signal RAMP1 and the second ramp signal RAMP2 are reduced compared to the reference ramp signal RAMP. When each of the first ramp signal RAMP1 and the second ramp signal RAMP2 is compared with the reference ramp signal RAMP, the decreasing ratios of the offset and slope are different, and an image with a high dynamic range may be obtained through dual slope gain, but the example embodiments are not limited thereto.

Figure 10:
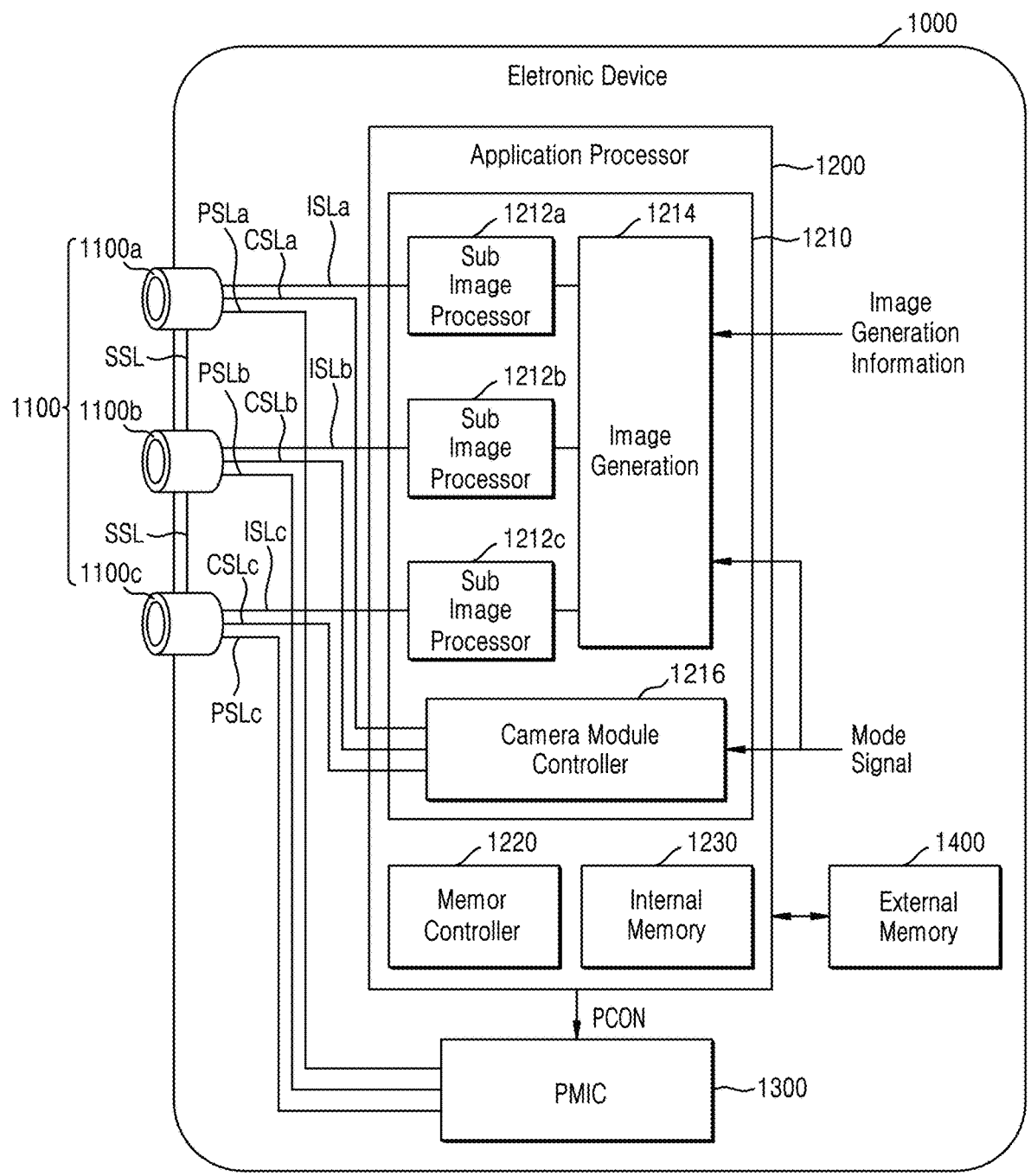
FIG. 10 is a block diagram of an electronic device including a multi-camera module according to some example embodiments.
Figure 11:
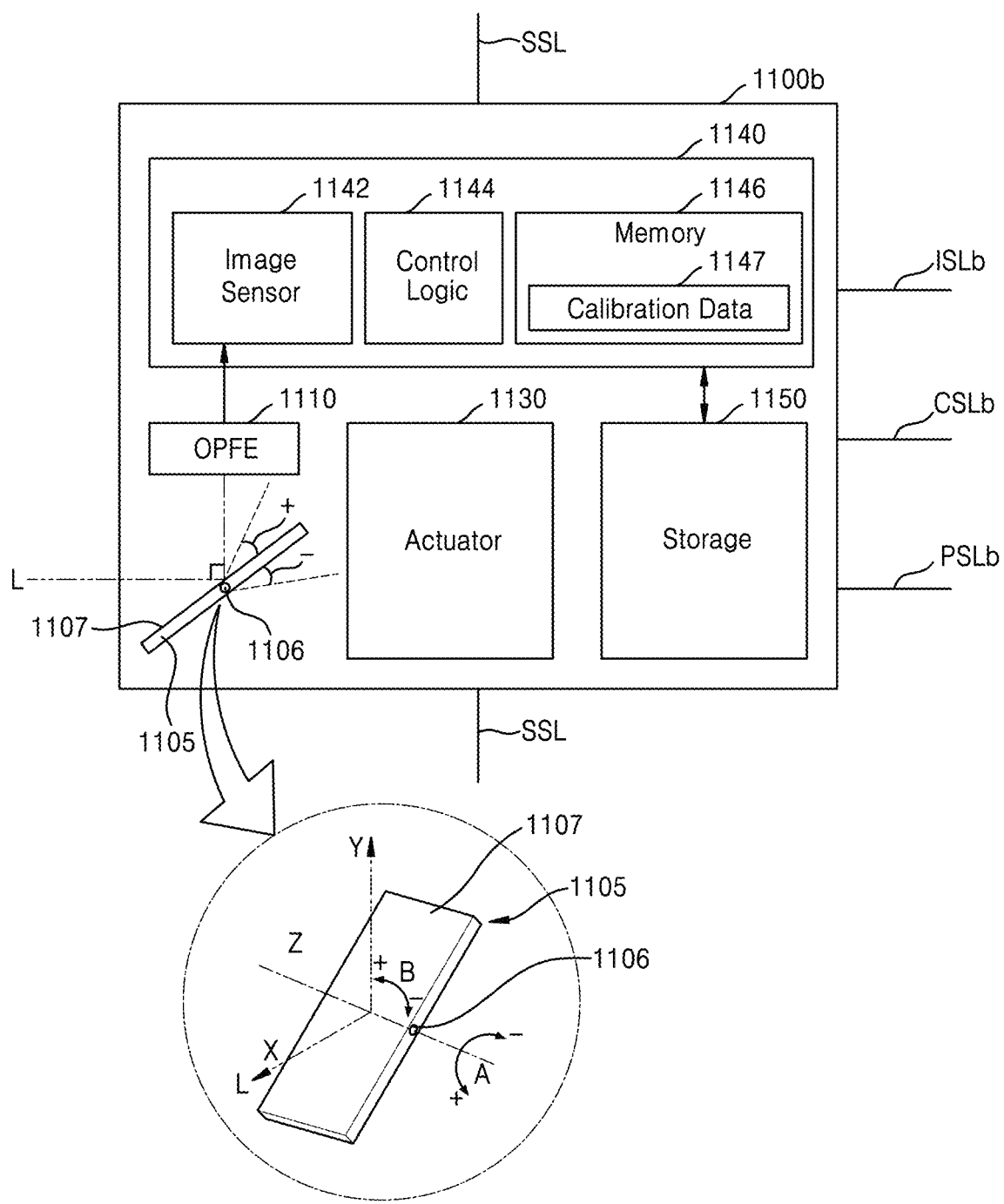
FIG. 11 is a detailed block diagram of the camera module of FIG. 10 according to some example embodiments.

FIG. 10 is a block diagram of an electronic device including a multi-camera module according to at least one example embodiment. FIG. 11 is a detailed block diagram of the camera module of FIG. 10 according to at least one example embodiment.

Referring to FIG. 10, an electronic device 1000 may include a camera module group 1100, an application processor 1200, a power management integrated circuit (PMIC) 1300, and/or an external memory 1400, etc., but the example embodiments are not limited thereto, and for example, the electronic device 1000 may include a greater or lesser number of constituent components.

The camera module group 1100 may include a plurality of camera modules, e.g., camera modules 1100a, 1100b, and 1100c, etc., but is not limited thereto, and for example, may include a greater or lesser number of camera modules. Although the drawing shows at least one example embodiment in which three camera modules 1100a, 1100b, and 1100c are disposed, the example embodiments are not limited thereto. In some example embodiments, the camera module group 1100 may be modified to include only two camera modules. Also, in some example embodiments, the camera module group 1100 may be modified to include k camera modules (where k is a natural number equal to or greater than 4).

Hereinafter, a detailed configuration of the camera module 1100b will be described in more detail with reference to FIG. 11, but the following description may be equally applied to other camera modules 1100a and 1100c according to one or more of the example embodiments.

Referring to FIG. 11, the camera module 1100b may include a prism 1105, an optical path folding element (OPFE) 1110, an actuator 1130, an image sensor 1140, and/or a storage, etc., but is not limited thereto.

The prism 1105 may include a reflective surface 1107 of a light reflective material to change a path of light L incident from the outside (e.g., from an external source, etc.).

In some example embodiments, the prism 1105 may change the path of light L incident in the first direction X to a second direction Y perpendicular to the first direction X, but is not limited thereto. In addition, the prism 1105 may rotate the reflective surface 1107 of the light reflecting material in the A direction around the central axis 1106, and/or rotate the central axis 1106 in the direction B to change the path of the light L incident in the first direction X to the second direction Y, which is perpendicular to the direction, etc. At this time, the OPFE 1110 may also move in a third direction Z perpendicular to the first direction X and the second direction Y, but is not limited thereto.

In some example embodiments, as shown, the maximum angle of rotation of the prism 1105 in the A direction may be, for example, less than 15 degrees in the plus A direction and greater than 15 degrees in the minus A direction, but the example embodiments are not limited thereto.

In some example embodiments, the prism 1105 may move, e.g., around 20 degrees in the plus or minus B direction, and/or between 10 degrees and 20 degrees, and/or between 15 degrees and 20 degrees, etc., and here, the moving angle may move at the same angle in the plus or minus B direction, and/or may move to an almost similar angle within a range of about 1 degree, but the example embodiments are not limited thereto.

In some example embodiments, the prism 1105 may move the reflective surface 1107 of the light reflective material in a third direction (e.g., the Z direction) parallel to the extension direction of the central axis 1106, but is not limited thereto.

The OPFE 1110 may include, for example, optical lenses including m (where m is a natural number) groups. The m lenses may move in the second direction Y to change the optical zoom ratio of the camera module 1100b. For example, when the basic optical zoom magnification of the camera module 1100b is Z, as m optical lenses included in the OPFE 1110 are moved, the optical zoom magnification of the camera module 1100b is 3Z, 5Z, and/or it may be changed to an optical zoom magnification of higher than 5Z, etc., but the example embodiments are not limited thereto.

The actuator 1130 may move the OPFE 1110 and/or an optical lens to a certain and/or desired position. For example, the actuator 1130 may adjust the position of the optical lens so that the image sensor 1142 is positioned at the focal length of the optical lens for accurate sensing, but is not limited thereto.

The image sensor 1140 may include an image sensor 1142, a control logic 1144 (e.g., control logic circuitry, control processing circuitry, etc.), and/or a memory 1146, etc., but is not limited thereto. The image sensor 1142 may sense an image of a sensing target using light L provided through an optical lens. The image sensor 1142 may generate image data having a high dynamic range by merging HCG image data and LCG image data, and furthermore, generate image data having a high dynamic range based on the first ramp signal RAMP1 and the second ramp signal RAMP2 based on the reference ramp signal RAMP generated by one ramp signal generator 130 (e.g., see FIG. 1), but the example embodiments are not limited thereto.

The control logic 1144 may control the overall operation of the camera module 1100b, but is not limited thereto. For example, the control logic 1144 may control the operation of the camera module 1100b according to and/or based on a control signal provided through the control signal line CSLb, but is not limited thereto. The control logic 1144 may control operations of the first switching circuit 410 and the second switching circuit 420 described with reference to FIG. 9, but the example embodiments are not limited thereto. For example, in a high-illuminance environment, the first switch SW1 and the third switch SW3 may be turned on, and the second switch SW2 and the fourth switch SW4 may be turned off, etc.

The memory 1146 may store information desired and/or required for operation of the camera module 1100b, such as calibration data 1147, etc., but is not limited thereto. The calibration data 1147 may include information desired and/or necessary for the camera module 1100b to generate image data using light L provided from the outside (e.g., from an external source, etc.). The calibration data 1147 may include, for example, information about a degree of rotation, information about a focal length, information about an optical axis, and the like, as described above, but the example embodiments are not limited thereto. When the camera module 1100b is implemented in the form of a multi-state camera in which the focal length changes according to and/or based on the position of the optical lens, the calibration data 1147 may include a focal length value for each position (and/or state) of the optical lens and information related to auto focusing, etc.

The storage 1150 may store image data sensed through the image sensor 1142. The storage 1150 may be disposed outside the image sensor 1140 and may be implemented in a stacked form with a sensor chip including the image sensor 1140, but the example embodiments are not limited thereto. In some example embodiments, the storage 1150 may be implemented as Electrically Erasable Programmable Read-Only Memory (EEPROM), but the example embodiments are not limited thereto.

Referring to FIGS. 10 and 11 together, in some example embodiments, each of the plurality of camera modules 1100a, 1100b, and 1100c may include an actuator 1130, but the example embodiments are not limited thereto. Accordingly, each of the plurality of camera modules 1100a, 1100b, and 1100c may include the same or different calibration data 1147 according to and/or based on the operation of the actuator 1130 included therein.

In some example embodiments, one (e.g., 1100b) of the plurality of camera modules 1100a, 1100b, and 1100c is a camera module in the form of a folded lens including the prism 1105 and the OPFE 1110 described above, and the remaining camera modules (e.g., 1100a and 1100c) may be vertical camera modules that do not include the prism 1105 and the OPFE 1110, but the example embodiments are not limited thereto.

In some example embodiments, one camera module (e.g., 1100c) of the plurality of camera modules 1100a, 1100b, and 1100c, for example, may be a vertical-type depth camera which extracts depth information using, e.g., Infra-Red (IR) light, but is not limited thereto. In this case, the application processor 1200 merges image data provided from the depth camera with image data provided from another camera module (e.g., 1100a or 1100b) to generate a 3D depth image, but the example embodiments are not limited thereto.

In some example embodiments, at least two camera modules (e.g., 1100a and 1100b) among the plurality of camera modules 1100a, 1100b, and 1100c may have different fields of view. In this case, for example, the optical lenses of at least two camera modules (e.g., 1100a and 1100b) among the plurality of camera modules 1100a, 1100b, and 1100c may be different from each other, but the example embodiments of the inventive concepts are not limited thereto.

Also, in some example embodiments, the fields of view of each of the plurality of camera modules 1100a, 1100b, and 1100c may be different from each other. In this case, optical lenses included in each of the plurality of camera modules 1100a, 1100b, and 1100c may also be different from each other, but are not limited thereto.

In some example embodiments, each of the plurality of camera modules 1100a, 1100b, and 1100c may be disposed physically separated from each other. That is, the sensing area of one image sensor 1142 is not divided and used by a plurality of camera modules 1100a, 1100b, and 1100c, but an independent image inside each of the plurality of camera modules 1100a, 1100b, and 1100c may be merged together.

Referring back to FIG. 10, the application processor 1200 may include an image processing device 1210, a memory controller 1220, and/or an internal memory 1230, etc., but the example embodiments are not limited thereto, and for example, the application processor 1200 may include a greater or lesser number of constituent components. According to at least one example embodiment, the application processor 1200 may be implemented separately from the plurality of camera modules 1100a, 1100b, and 1100c, but is not limited thereto. For example, the application processor 1200 and the plurality of camera modules 1100a, 1100b, and 1100c may be separately implemented as separate semiconductor chips, etc.

The image processing device 1210 may include a plurality of sub image processors 1212a, 1212b, and 1212c, an image generator 1214, and/or a camera module controller 1216, etc.

The image processing device 1210 may include a plurality of sub image processors 1212a, 1212b, and 1212c corresponding to the number of the plurality of camera modules 1100a, 1100b, and 1100c, but the example embodiments are not limited thereto.

Image data generated from each of the plurality of camera modules 1100a, 1100b, and 1100c may be provided to the corresponding sub image processors 1212a, 1212b, and 1212c through a plurality of image signal lines ISLa, ISLb, and ISLc. For example, image data generated from the camera module 1100a may be provided to the sub image processor 1212a through the image signal line ISLa, image data generated from the camera module 1100b may be provided to the sub image processor 1212b through the image signal line ISLb, and/or image data generated by the camera module 1100c may be provided to the sub image processor 1212c through the image signal line ISLc, etc. Such image data transmission may be performed using, for example, a Camera Serial Interface (CSI) based on Mobile Industry Processor Interface (MIPI), but the example embodiments are not limited thereto.

Meanwhile, in some example embodiments, one sub image processor may be arranged to correspond to a plurality of camera modules, but the example embodiments are not limited thereto. For example, the sub image processor 1212a and the sub image processor 1212c are not implemented separately from each other as shown, but integrated into one sub image processor, and image data provided from the camera modules 1100a and 1100c may be selected through a selection element (e.g., a multiplexer) and then provided to the integrated sub image processor, etc.

Image data provided to each of the sub image processors 1212a, 1212b, and 1212c may be provided to the image generator 1214. The image generator 1214 may generate an output image using image data provided from each of the sub image processors 1212a, 1212b, and 1212c according to and/or based on image generating information and/or a mode signal, etc.

Specifically, the image generator 1214 may generate an output image by merging at least some of image data generated from the plurality of camera modules 1100a, 1100b, and 1100c having different fields of view, according to and/or based on the image generation information and/or mode signal. Also, the image generator 1214 may generate an output image by selecting any one of image data generated from the plurality of camera modules 1100a, 1100b, and 1100c having different fields of view, according to and/or based on the image generation information and/or mode signal, etc.

In some example embodiments, the image creation information may include a zoom signal and/or zoom factor. Also, in some example embodiments, the mode signal may be a signal based on a mode selected by a user, for example.

When the image generation information is a zoom signal (zoom factor) and each of the plurality of camera modules 1100a, 1100b, and 1100c has a different field of view, the image generator 1214 may perform different operations according to the type of zoom signal. For example, when the zoom signal is the first signal, after merging the image data output from the camera module 1100a and the image data output from the camera module 1100c, an output image may be generated using the merged image signal and image data output from the camera module 1100b not used for merging. If the zoom signal is a second signal different from the first signal, the image generator 1214 may generate an output image by selecting any one of image data output from each of the plurality of camera modules 1100a, 1100b, and 1100c without merging the image data. However, the embodiments are not limited thereto, and a method of processing image data may be modified and implemented as needed.

In some example embodiments, the image generator 1214 receives a plurality of image data having different exposure times from at least one of the plurality of sub image processors 1212a, 1212b, and 1212c, and performs high dynamic range (HDR) processing on the plurality of image data to generate merged image data with an increased dynamic range.

The camera module controller 1216 may provide a control signal to each of the plurality of camera modules 1100a, 1100b, and 1100c. A plurality of control signals generated from the camera module controller 1216 may be provided to the corresponding plurality of camera modules 1100a, 1100b, and 1100c through separate control signal lines CSLa, CSLb, and CSLc.

Any one of the plurality of camera modules 1100a, 1100b, and 1100c is designated as a primary camera module (e.g., 1100b) according to and/or based on image generation information including a zoom signal and/or a mode signal, and the remaining camera modules (e.g., 1100a and 1100c) may be designated as secondary cameras. Such information may be included in a control signal and provided to the corresponding plurality of camera modules 1100a, 1100b, and 1100c through separate control signal lines CSLa, CSLb, and CSLc.

Camera modules operating as a primary camera module and a secondary camera module may be changed according to and/or based on a zoom factor and/or an operation mode signal. For example, when the field of view of the camera module 1100a is wider than the field of view of the camera module 1100b and the zoom factor indicates a low zoom magnification, the camera module 1100b may operate as the primary camera module and the camera module 1100a may operate as the secondary camera module. Conversely, when the zoom factor indicates a high zoom magnification, the camera module 1100a may operate as the primary camera module and the camera module 1100b may operate as the secondary camera module.

In some example embodiments, a control signal provided from the camera module controller 1216 to each of the plurality of camera modules 1100a, 1100b, and 1100c may include a sync enable signal. For example, when the camera module 1100b is a primary camera and the camera modules 1100a and 1100c are secondary cameras, the camera module controller 1216 may transmit a sync enable signal to the camera module 1100b, but the example embodiments are not limited thereto. The camera module 1100b receiving such a sync enable signal may generate a sync signal based on the sync enable signal provided, and provide the generated sync signal to the camera modules 1100a and 1100c through the sync signal line SSL, etc. The camera module 1100b and the camera modules 1100a and 1100c may transmit image data to the application processor 1200 in synchronization with the sync signal, but the example embodiments are not limited thereto.

In some example embodiments, at least one control signal provided from the camera module controller 1216 to the plurality of camera modules 1100a, 1100b, and 1100c may include mode information according to the mode signal. Based on this mode information, the plurality of camera modules 1100a, 1100b, and 1100c may operate in a first operation mode and a second operation mode in relation to sensing speed, but the example embodiments are not limited thereto.

The plurality of camera modules 1100a, 1100b, and 1100c may generate image signals at a first rate in a first operating mode (e.g., generate an image signal of the first frame rate) and encode the generated images at a second rate higher than the first rate (e.g., encode an image signal having a second frame rate higher than the first frame rate), and may transmit the encoded image signal to the application processor 1200. At this time, the second rate may be less than 30 times the first rate, but the example embodiments are not limited thereto.

The application processor 1200 may store the received image signal, that is, the encoded image signal, in the internal memory 1230 and/or the external memory 1400 external to the application processor 1200, and then, read out and decode the encoded image signal from the memory 1230 and/or the external memory 1400, and display image data generated based on the decoded image signal. For example, a corresponding sub-processor among the plurality of sub-image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third rate lower than the first rate (e.g., generate image signals at a third frame rate lower than the first frame rate), and transmit image signals to the application processor 1200, but the example embodiments are not limited thereto. An image signal provided to the application processor 1200 may be an unencoded signal, but is not limited thereto. The application processor 1200 may perform image processing on a received image signal and/or store the image signal in the memory 1230 and/or the external memory 1400, etc.

The PMIC 1300 may supply power, e.g., a power supply voltage, to each of the plurality of camera modules 1100a, 1100b, and 1100c. For example, the PMIC 1300 may supply first power to the camera module 1100a through a power signal line PSLa under the control of the application processor 1200, and supply second power to the camera module 1100b through the power signal line PSLb, and third power to the camera module 1100c through the power signal line PSLc, etc.

The PMIC 1300 may generate power corresponding to each of the plurality of camera modules 1100a, 1100b, and 1100c in response to a power control signal PCON from the application processor 1200, and may also adjust the level of the power. The power control signal PCON may include a power control signal for each operation mode of the plurality of camera modules 1100a, 1100b, and 1100c. For example, the operation mode may include a low power mode, and in this case, the power control signal PCON may include information about a camera module operating in the low power mode and a set power level. Levels of the powers provided to each of the plurality of camera modules 1100a, 1100b, and 1100c may be the same or different from each other. Also, the level of power may be dynamically changed.

While various example embodiments of the inventive concepts have been particularly shown and described, it will be understood that various changes in form and details to the example embodiments may be made therein without departing from the spirit and scope of the following claims.

What is claimed is:

1. An image sensor comprising:
a pixel configured to output a pixel signal through a column line;
a ramp signal generator configured to generate a reference ramp signal having a level that decreases based on a desired slope;
a first gain circuit configured to receive the reference ramp signal, and generate a first ramp signal based on the reference ramp signal, the first ramp signal having a different slope than the reference ramp signal;
a second gain circuit configured to receive the reference ramp signal, and generate a second ramp signal based on the reference ramp signal, the second ramp signal having a different slope than the first ramp signal;
a first comparator configured to generate a first comparison signal based on the first ramp signal and the pixel signal; and
a second comparator configured to generate a second comparison signal based on the second ramp signal and the pixel signal.

2. The image sensor of claim 1, wherein
the first gain circuit comprises,
a first capacitor including a first terminal and a second terminal, the first terminal connected to a first input node, and the second terminal connected to the ramp signal generator, and
a second capacitor including a first terminal and a second terminal, the first terminal connected to the first capacitor and the first input node in common, and the second terminal connected to ground; and
the second gain circuit comprises a third capacitor including a first terminal and a second terminal, the first terminal connected to a third input node, and the second terminal connected to the ramp signal generator.

3. The image sensor of claim 2, wherein the second gain circuit further comprises:
a fourth capacitor including a first terminal and a second terminal, the first terminal connected in common to the third capacitor and the third input node, and the second terminal connected to ground, and wherein
a ratio of a capacitance of the second capacitor to a capacitance of the first capacitor, and
a ratio of a capacitance of the fourth capacitor to a capacitance of the third capacitor are different from each other.

4. The image sensor of claim 1, further comprising:
a first counter configured to generate a first pixel value based on the first comparison signal; and
a second counter configured to generate a second pixel value based on the second comparison signal,
wherein the first pixel value is greater than the second pixel value.

5. The image sensor of claim 1, wherein
the pixel is further configured to,
operate in at least a high conversion gain (HCG) mode and a low conversion gain (LCG) mode,
output a first pixel signal as the pixel signal in the HCG mode, and
output a second pixel signal as the pixel signal in the LCG mode;
the first comparator is further configured to receive the first pixel signal through a fifth capacitor; and
the second comparator is further configured to receive the second pixel signal through a sixth capacitor.

6. The image sensor of claim 5, further comprising:
a first selection switch connected between the fifth capacitor and the pixel; and
a second selection switch connected between the sixth capacitor and the pixel.

7. The image sensor of claim 6, wherein
the first selection switch is further configured to be turned on in the HCG mode and turned off in the LCG mode; and
the second selection switch is further configured to be turned on in the LCG mode and turned off in the HCG mode.

8. The image sensor of claim 5, wherein
an input range of the first comparator is wider than an input range of the second comparator;
the first comparator is further configured to operate while the pixel operates in the HCG mode; and
the second comparator is further configured to be operate while the pixel operates in the LCG mode.

9. An image sensor comprising:
a pixel configured to output a pixel signal through a column line;

a ramp signal generator configured to generate a reference ramp signal having a level that decreases based on a desired slope;

a first comparison circuit configured to generate a first ramp signal having a first slope, and generate a first comparison signal based on the first ramp signal and the pixel signal; and a second comparison circuit configured to generate a second ramp signal having a second slope based on the reference ramp signal, the second slope being different from the first slope, and the second comparison circuit is further configured to generate a second comparison signal based on the second ramp signal and the pixel signal.

10. The image sensor of claim 9, wherein the image sensor is further configured to:

generate first image data based on the first comparison signal, the first image data corresponding to a first luminance; and generate second image data based on the second comparison signal, the second image data corresponding to a second luminance, the second luminance being lower than the first luminance.

11. The image sensor of claim 9, wherein
the first comparison circuit comprises,
a first comparator configured to compare the first ramp signal with the pixel signal,
a first capacitor including a first terminal connected to a first input node,
a second capacitor including a first terminal commonly connected to the first capacitor and the first input node, and
a first switching circuit configured to connect a second terminal of the second capacitor to a second terminal of the first capacitor or to ground; and
the second comparison circuit comprises,
a second comparator configured to compare the second ramp signal with the pixel signal,
a third capacitor including a first terminal connected to a third input node,
a fourth capacitor including a first terminal commonly connected to the third capacitor and a second input node of the first comparator, and
a second switching circuit configured to connect the fourth capacitor to the third capacitor or the ground.

12. The image sensor of claim 11, wherein
the first switching circuit comprises,
a first switch connected between the second terminal of the first capacitor and the second terminal of the second capacitor; and
a second switch connected between the second terminal of the second capacitor and ground; and
the second switching circuit comprises,
a third switch connected between the second terminal of the third capacitor and the second terminal of the fourth capacitor, and
a fourth switch connected between the second terminal of the fourth capacitor and ground.

13. The image sensor of claim 9, further comprising:
a selection circuit connecting the column line to the first comparison circuit or the second comparison circuit, wherein
the pixel is further configured to operate in a high conversion gain (HCG) mode and a low conversion gain (LCG) mode, output a first pixel signal as the pixel signal in the HCG mode, and output a second pixel signal as the pixel signal in the LCG mode, while in the HCG mode, the selection circuit is further configured to connect the column line to the first comparison circuit, and the first comparison circuit is further configured to receive the first pixel signal through the column line, and while in the LCG mode, the selection circuit is further configured to connect the column line to the second comparison circuit, and the second comparison circuit is further configured to receive the second pixel signal through the column line.

14. The image sensor of claim 13, wherein the selection circuit comprises:

a first selection switch connected between the first comparison circuit and the pixel; and a second selection switch connected between the second comparison circuit and the pixel.

15. The image sensor of claim 14, wherein while in the HCG mode, the first selection switch is further configured to be turned on and the second selection switch is further configured to be turned off; and while in the LCG mode, the second selection switch is further configured to be turned on and the first selection switch is further configured to be turned off.

16. The image sensor of claim 13, wherein
the first comparison circuit is further configured to generate a first comparison signal based on the first ramp signal and the first pixel signal;

the second comparison circuit is further configured to generate a second comparison signal based on the second ramp signal and the second pixel signal; and the image sensor is further configured to generate first image data based on the first comparison signal, the first image data corresponding to a first luminance, and generate second image data based on the second comparison signal, the second image data corresponding to a second luminance, and the second luminance being lower than the first luminance.

17. The image sensor of claim 13, wherein
the first comparison circuit comprises,
a first comparator configured to compare the first ramp signal with the first pixel signal; and
the second comparison circuit comprises,
a second comparator configured to compare the second ramp signal with the second pixel signal,
wherein an input range of the first comparator is wider than that of the second comparator.

18. An image processing device comprising:
a pixel configured to output a pixel signal through a column line;
a ramp signal generator configured to generate a reference ramp signal having a level that decreases with a desired slope;
an analog-to-digital conversion circuit configured to generate a first comparison signal and a second comparison signal based on the pixel signal and the reference ramp signal; and
a signal processor configured to generate high dynamic range (HDR) image data by merging first image data and second image data, the first image data generated based on the first comparison signal, and the second image data generated based on the second comparison signal, and the analog-to-digital conversion circuit comprises,
a first comparator configured to receive the pixel signal and a first ramp signal through a first set of voltage input capacitors connected to a first input node and a second input node, respectively, and the first comparator is further configured to generate the first comparison signal based on the pixel signal and the first ramp signal;

a second comparator configured to receive the pixel signal and a second ramp signal through a second set of voltage input capacitors, and the second comparator is further configured to generate the second comparison signal based on the pixel signal and the second ramp signal; and a voltage dividing capacitor connected to the first input node and ground, wherein a slope of the first ramp signal is different from a slope of the second ramp signal, and a difference between the slope of the first ramp signal and the slope of the second ramp signal is based on a capacitance of the voltage dividing capacitor.

19. The image processing device of claim 18, wherein a capacitance of the voltage input capacitor connected to the first input node and a capacitance of the voltage dividing capacitor are the same.

20. The image processing device of claim 18, wherein
the analog-to-digital conversion circuit is further configured to,
generate a first pixel value by counting the first comparison signal, and
generate a second pixel value by counting the second comparison signal; and
the signal processor is further configured to generate the first image data based on the first pixel value, and generate the second image data based on the second pixel value.

* * * * *